United States Patent
Shubin et al.

(10) Patent No.: US 11,425,182 B1
(45) Date of Patent: Aug. 23, 2022

(54) SYSTEMS AND METHODS FOR DYNAMICALLY ENCODING MEDIA STREAMS

(71) Applicant: Meta Platforms, Inc., Menlo Park, CA (US)

(72) Inventors: Vladimir Shubin, Bellevue, WA (US); Clifford Neil Didcock, Sammamish, WA (US); Hemal Khatri, Redmond, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/138,376

(22) Filed: Dec. 30, 2020

(51) Int. Cl.
*H04L 65/60* (2022.01)
*H04N 21/2662* (2011.01)

(52) U.S. Cl.
CPC .......... *H04L 65/607* (2013.01); *H04L 65/601* (2013.01); *H04N 21/2662* (2013.01)

(58) Field of Classification Search
None
See application file for complete search history.

(56) References Cited

U.S. PATENT DOCUMENTS

| | | | |
|---|---|---|---|
| 9,769,332 B1 * | 9/2017 | Delaunay | H04N 1/00244 |
| 10,097,883 B1 * | 10/2018 | Rasool | H04N 21/2387 |
| 2012/0212668 A1 * | 8/2012 | Schultz | H04N 5/772 |
| | | | 348/E7.02 |
| 2013/0103849 A1 * | 4/2013 | Mao | H04N 21/8456 |
| | | | 709/231 |
| 2013/0198786 A1 * | 8/2013 | Cook | H04N 21/43615 |
| | | | 725/78 |
| 2014/0047074 A1 * | 2/2014 | Chung | H04L 67/32 |
| | | | 709/219 |
| 2014/0161050 A1 * | 6/2014 | Grinshpun | H04N 21/2393 |
| | | | 370/328 |
| 2014/0281011 A1 * | 9/2014 | Zarom | H04L 65/602 |
| | | | 709/231 |
| 2015/0249623 A1 * | 9/2015 | Phillips | H04L 65/4092 |
| | | | 709/219 |

(Continued)

FOREIGN PATENT DOCUMENTS

WO    WO-2021260469 A1 * 12/2021 ............. G06F 3/012

OTHER PUBLICATIONS

Ozer, Jan, "What is MPEG Dash?", URL: https://www.streamingmedia.com/Articles/ReadArticle.aspx?ArticleID=79041, retrieved on Jun. 25, 2021, 5 pages.

*Primary Examiner* — Dhairya A Patel
(74) *Attorney, Agent, or Firm* — FisherBroyles, LLP

(57) ABSTRACT

The disclosed computer-implemented method may include (1) receiving a media stream, (2) determining a first priority level for the media stream, (3) generating one or more first encoded segments from a first segment of the media stream based on the first priority level, (4) determining, while generating the one or more first encoded segments, a second priority level for the media stream, the second priority level being different than the first priority level, (5) generating one or more second encoded segments from a second segment of the media stream based on the second priority level, and (6) streaming the one or more first encoded segments and the one or more second encoded segments to one or more client devices. Various other methods, systems, and computer-readable media are also disclosed.

20 Claims, 13 Drawing Sheets

(56) References Cited

U.S. PATENT DOCUMENTS

| | | | |
|---|---|---|---|
| 2016/0255131 A1* | 9/2016 | Bulava | H04L 65/601 |
| | | | 709/219 |
| 2018/0041809 A1* | 2/2018 | Chang | H04N 21/4333 |
| 2018/0242025 A1* | 8/2018 | Chou | H04N 21/2662 |
| 2019/0089759 A1* | 3/2019 | Yeh | H04L 65/607 |
| 2020/0267429 A1* | 8/2020 | He | H04N 21/23439 |
| 2022/0085660 A1* | 3/2022 | Glover | H02J 7/00032 |

\* cited by examiner

SYSTEMS AND METHODS FOR DYNAMICALLY ENCODING MEDIA STREAMS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
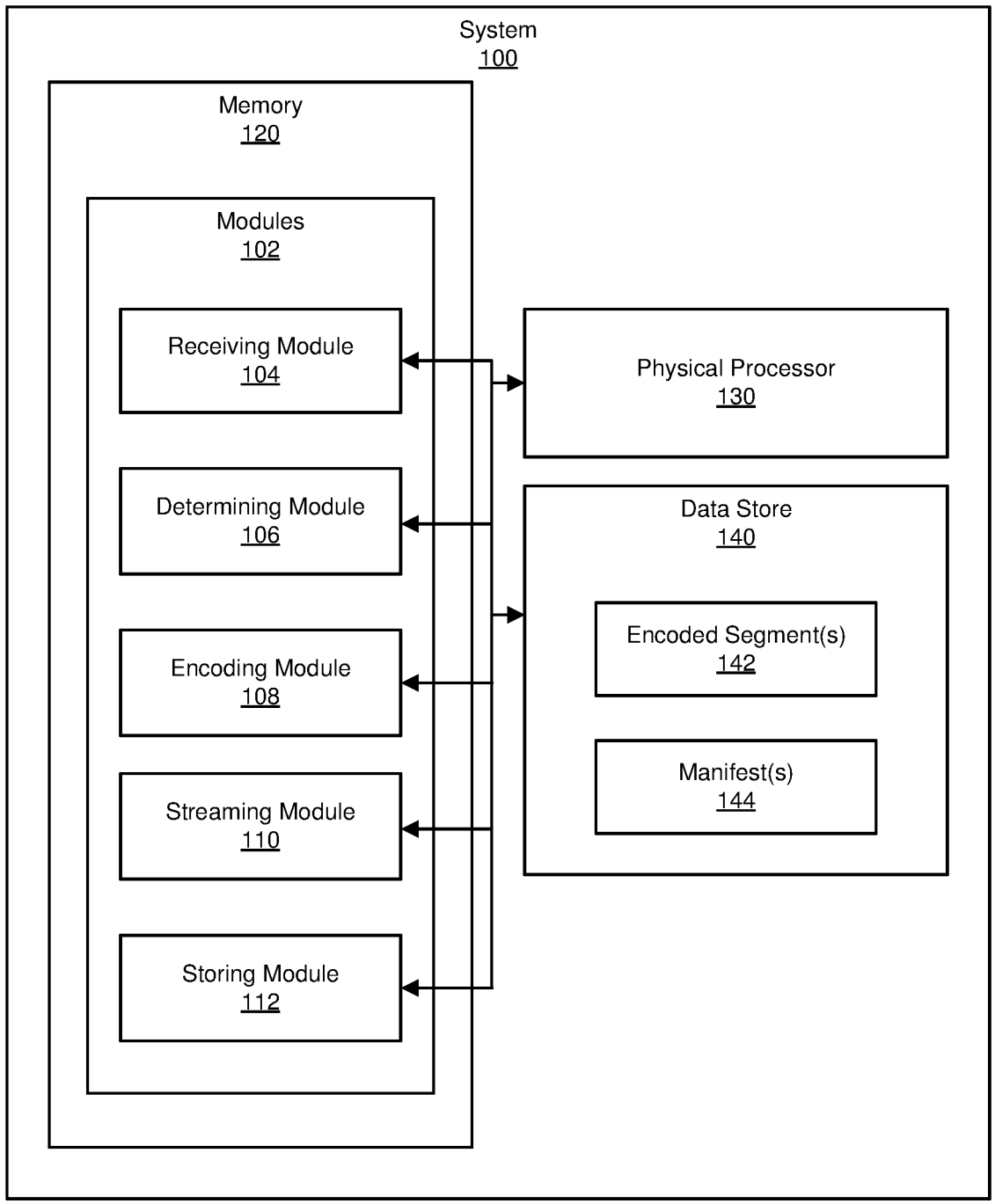
FIG. 1 is a block diagram of an example system for dynamically encoding media streams.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Before streaming media to client devices, conventional streaming services typically encode the media at multiple bit rates and/or multiple resolutions in order to accommodate the client devices' capabilities, the client devices' available bandwidths, general variability of the client devices' bandwidths, and/or users' preferences for quality. In an ideal world with unlimited resources, conventional streaming services may encode media streams at every bit rate and/or resolution needed to accommodate for these factors. Unfortunately, real-world streaming services may have limited encoding resources that must be allocated across an unpredictable number of media streams. Some conventional streaming services that perform media encoding in real time (e.g., for live broadcasts) overprovision resources to absorb infrequent and/or severe spikes in traffic, which often results in such systems having resources that remain idle for a significant portion of time. Other conventional streaming services may downgrade service to new media streams when encountering such infrequent and/or severe traffic spikes in order to maintain quality for existing media streams.

The present disclosure is generally directed to dynamically encoding streams, especially live video broadcasts. As will be explained in greater detail below, embodiments of the present disclosure may, during a live broadcast, dynamically change the overall quality (e.g., bit rate or resolution) of one or more encoded streams carrying the live broadcast based on an up-to-date priority level of the live broadcast. In some embodiments, a live broadcast whose relative priority or importance increases over time may have the quality of its encoded streams increased. For example, a live stream that becomes viral midstream may have the quality of its encoded streams increased in step with its rising viewer count. In other embodiments, a live broadcast whose relative priority or importance decreases over time may have the quality of its encoded streams decreased.

The disclosed systems may monitor various statistics and metrics for triggering changes to quality and/or for dictating quality levels. Such metrics may include broadcast-level metrics (e.g., number of viewers, engagement, importance, usage, content type (e.g., inserted ads or gaming), object recognition, scene recognition (e.g., a score in a sports match), durations, and timing of broadcasted events), server-side system metrics (e.g., CPU, memory, or network bandwidth utilization), or client-side system metrics (e.g., available display resolution, bandwidth, or frame rate). In some embodiments, the disclosed systems may dynamically adjust the qualities of all live broadcasts in order to use a predetermined amount of server-side capacity (e.g., close to 100%). In some examples, the disclosed systems may lower the quality of lower priority broadcasts to preserve and/or increase the quality of higher priority broadcasts.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-4 and 6-13, detailed descriptions of systems for dynamically encoding media streams. Detailed descriptions of corresponding computer-implemented methods will also be provided in connection with FIG. 5.

FIG. 1 is a block diagram of an example system 100 for dynamically encoding media streams. As illustrated in this figure, example system 100 may include one or more modules 102 for performing one or more tasks. As will be explained in greater detail below, modules 102 may include a receiving module 104 that receives media streams for encoding. Example system 100 may also include a determining module 106 that determines priority levels of the media streams received by receiving module 104. Example system 100 may also include an encoding module 108 that dynamically encodes segments of the media stream at varying qualities (e.g., resolutions, bit rates, etc.) based on the determined priority levels for streaming to one or more client devices. Additionally, example system 100 may include a streaming module 110 that streams the encoded segments of the media stream to the one or more client devices. In some embodiments, example system 100 may also include a storing module 112 that stores the encoded segments of the media stream to one or more data stores 140 (e.g., for later video-on-demand streaming).

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate dynamic encoding of media streams based on the media streams' changing priority levels. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also shown in FIG. 1, example system 100 may also include one or more data stores, such as data store 140, that may receive, store, cache, maintain, and/or otherwise interact with the data described herein. Data store 140 may include any type or form of volatile or non-volatile storage device or medium capable of storing data. Data store 140 may represent portions of a single data store or computing device or a plurality of data stores or computing devices. In some embodiments, data store 140 may be a logical container for data and may be implemented in various forms (e.g., a database, a file, a file system, a data structure, etc.). Examples of data store 140 may include, without limitation, files, file systems, file caches, distributed file systems, distributed file caches, data stores, databases, and/or database management systems such as an operational data store (ODS), a relational database, a NoSQL database, a NewSQL database, and/or any other suitable organized collection of data. Examples of data store 140 may be implemented using, without limitation, Random Access Memory (RAM), Read Only Memory (ROM), flash memory, Hard Disk Drives (HDDs), Solid-State Drives (SSDs), optical disk drives, variations or combinations of one or more of the same, or any other suitable storage memory.

In at least one example, data store 140 may include (e.g., store, cache, host, access, maintain, etc.) one or more encoded segment(s) 142 of a media stream and/or one or more manifest(s) 144 of the media stream. In some examples, encoded segment(s) 142 and/or manifest(s) 144 may include any portion of a file, document, or other data item that may be stored by data store 140 and that may include any combination of text information, audio information, visual information, audiovisual information, and so forth. In some examples, encoded segment(s) 142 may include data representative of a video file (e.g., an electronic representation of moving visual images in the form of encoded digital data) and/or may include any suitable combination of visual information, audio information, textual information, and so forth. Manifest(s) 144 may include data descriptive of a media stream and/or one or more of its encoded segments. In some examples, manifest(s) 144 may represent data describing a quality (e.g., a resolution, bit rate, a codec, etc.) of one or more encoded segments of a media stream and a location from which the one or more encoded segments may be accessed. In at least one example, each of manifest(s) 144 may represent a Media Presentation Description (MPD) that describes encoded segment information such as timing, uniform Resource locator (URL), and/or quality characteristics like video resolution and bit rates.

Figure 2:
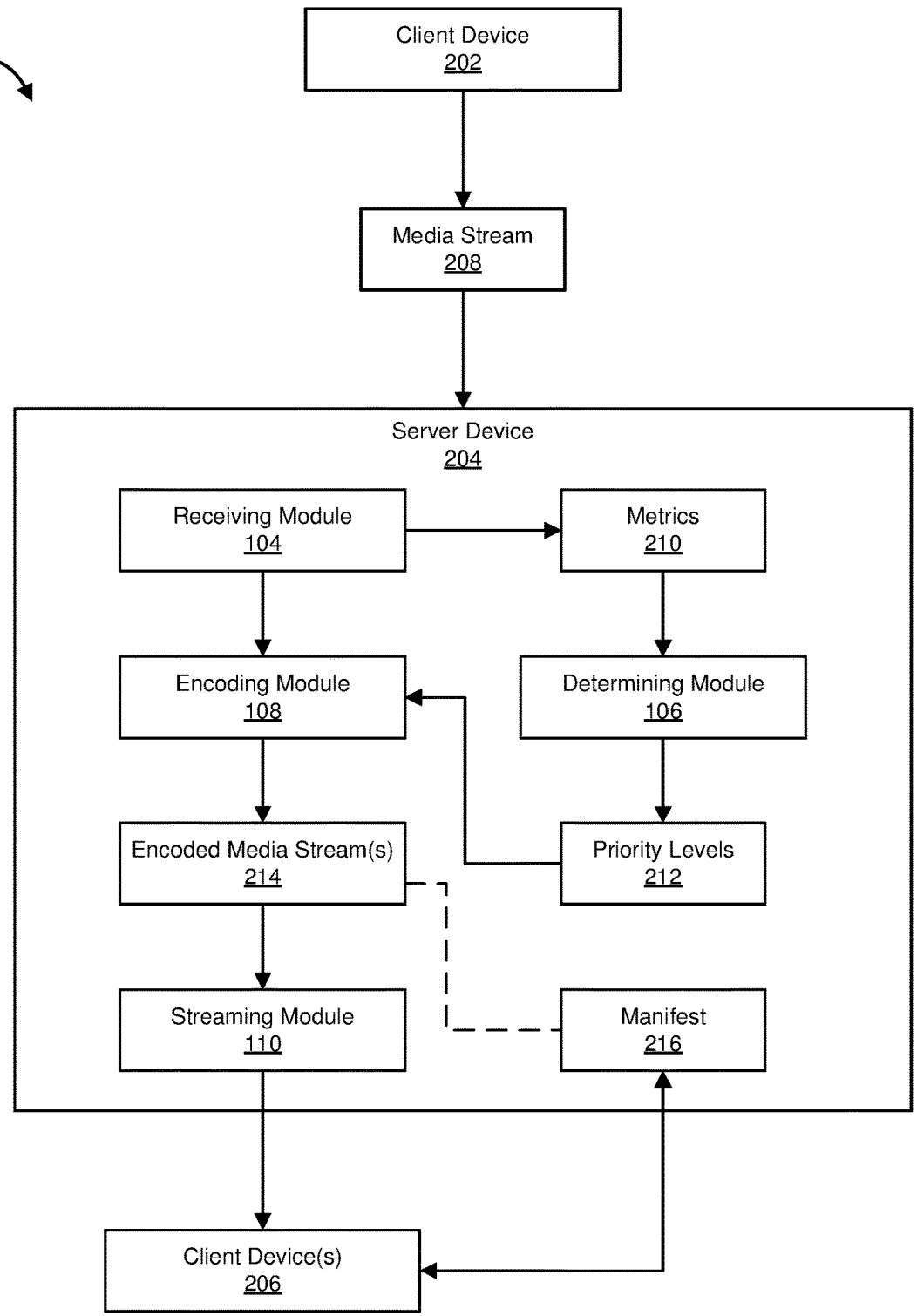
FIG. 2 is a block diagram of an example implementation of a system for dynamically encoding media streams.

Example system 100 in FIG. 1 may be implemented in a variety of ways. For example, all or a portion of example system 100 may represent portions of an example media-streaming system 200 ("system 200") in FIG. 2. As shown in FIG. 2, system 200 may include a client device 202, a server device 204, and one or more additional client device(s) 206. In at least one example, client device 202, server device 204, and/or client device(s) 206 may be programmed with one or more of modules 102 (e.g., receiving module 104, determining module 106, encoding module 108, streaming module 110, and/or storing module 112).

Figure 3:
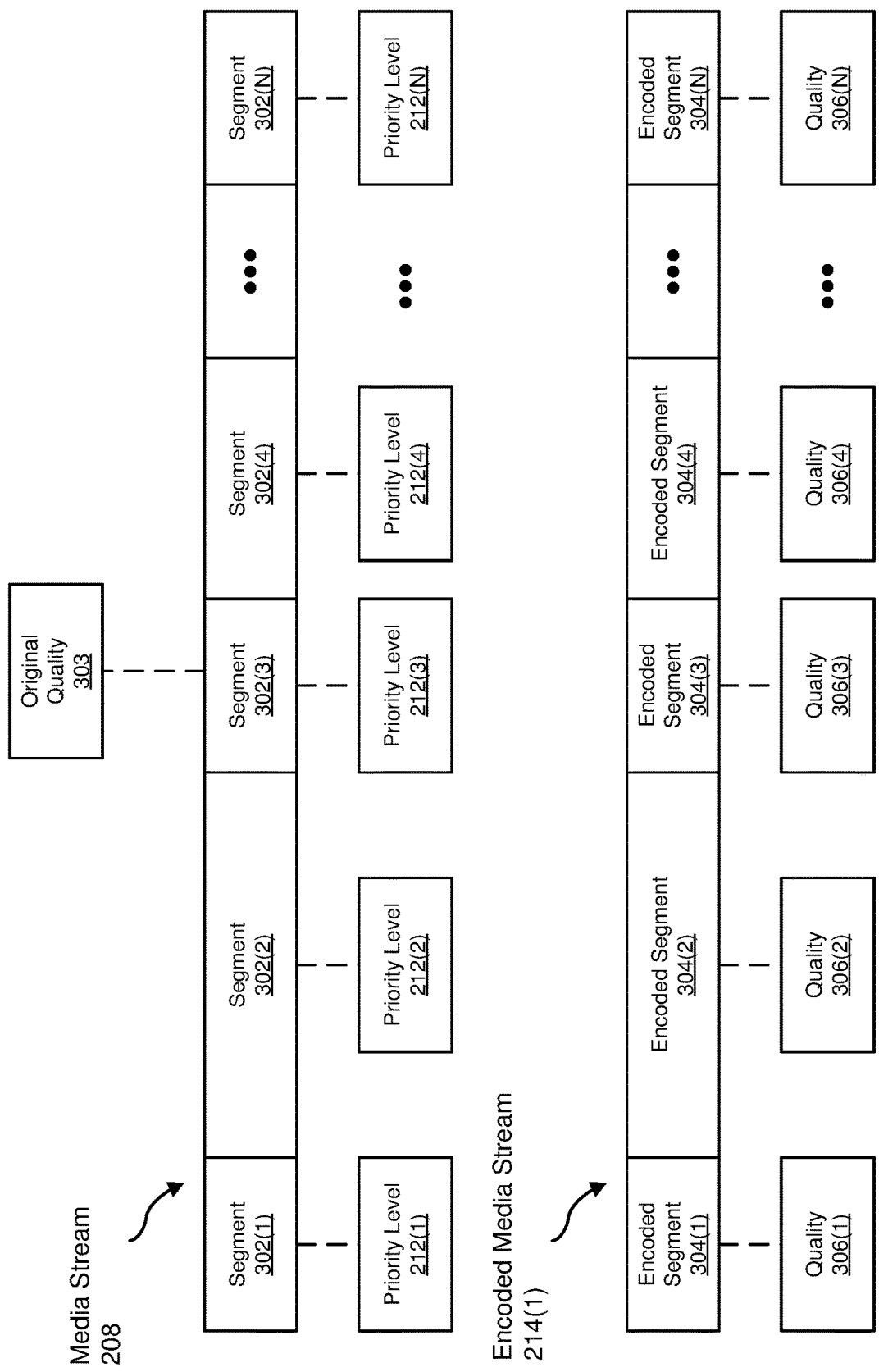
FIG. 3 is a block diagram of an exemplary media stream having multiple segments and an associated exemplary encoded media stream having multiple encoded segments, according to some embodiments.

In at least one embodiment, one or more modules 102 from FIG. 1 may, when executed by server device 204, enable server device 204 to perform one or more operations to dynamically encode media streams. For example, as will be described in greater detail below, receiving module 104 may cause server device 204 to receive a media stream 208 (e.g., a video stream, an audio stream, and/or any other form of encodable data) from client device 202. As shown in FIG. 3, media stream 208 may include multiple segments 302(1)-(N) and/or may have an original quality 303 (e.g., an original resolution, an original bit rate, an original codec, etc.). In some embodiments, a segment of a media stream may represent any delineated portion of a media stream or any continuous portion, shot, or scene within the media stream. In some embodiments, a segment of a media stream may represent an amount of the media stream fitting a receiving buffer or an encoding buffer. In some embodiments, a segment of a media stream may represent any portion of the media stream whose characteristics differ from other portions of the media stream and/or any portion of the media stream whose characteristics are relatively constant, are relatively stable, or remain close to or within a particular range. Examples of characteristics that may define different segments within a media stream include, without limitation, complexity, texture, motion, subjects, and/or content. In at least one embodiment, a segment of a media stream may represent a single transcoded or encoded segment of a video stream (e.g., a segment of a video stream delineated by keyframes or Intra-coded (I) frames).

In some examples, determining module 106 may cause server device 204 to use one or more metrics 210 to determine two or more differing priority levels 212 for media stream 208. For example, as shown in FIG. 3, determining module 106 may cause server device 204 to use one or more metrics 210 to determine priority levels 212(1)-(N) for segments 302(1)-(N) of media stream 208, respectively. Encoding module 108 may then cause server device 204 to encode media stream 208 for streaming at various quality levels to client device(s) 206 based on priority levels 212 (resulting in, e.g., one or more encoded media stream(s) 214). For example, as shown in FIG. 3, encoding module 108 may cause server device 204 to encode segments 302(1)-(N) of media stream 208 at qualities 306(1)-(N) (resulting in, e.g., encoded segments 304(1)-(N)). Finally, streaming module 110 may cause server device 204 to stream encoded media stream(s) 214 to client device(s) 206. For example, streaming module 110 may cause server device 204 to stream one or more of encoded segments 304(1)-(N) to one or more of client device(s) 206.

Client device 202, server device 204, and/or client device(s) 206 generally represent any type or form of computing device capable of reading and/or executing computer-executable instructions. Examples of client device 202, server device 204, and/or client device(s) 206 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device. Although illustrated as a single entity in FIG. 2, server device 204 may include and/or represent a plurality of servers that work and/or operate in conjunction with one another.

Figure 4:
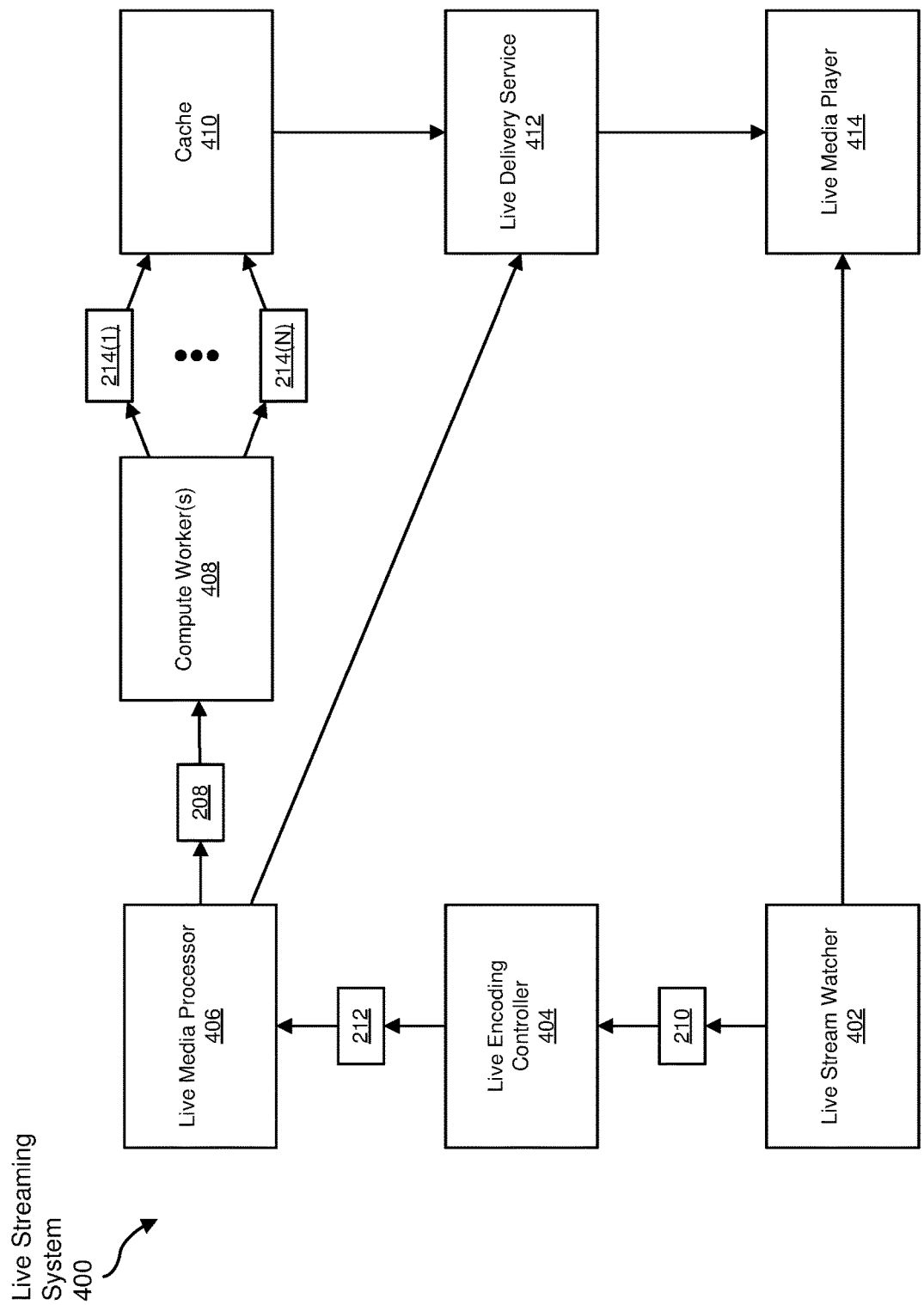
FIG. 4 is a block diagram of another example implementation of a system for dynamically encoding media streams.

In some examples, all or a portion of example system 100 may represent portions of an example live streaming system 400 ("system 400") in FIG. 4. As shown in FIG. 4, system 400 may include a live stream watcher 402, a live encoding controller 404, a live media processor 406, one or more compute worker(s) 408, a cache 410, a live delivery service 412, and a live media player 414. In at least one example, live stream watcher 402, live encoding controller 404, live media processor 406, compute worker(s) 408, cache 410, live delivery service 412, and/or live media player 414 may be programmed with one or more of modules 102 (e.g., receiving module 104, determining module 106, encoding module 108, streaming module 110, and/or storing module 112) and may perform some or all of the steps of method 500 shown in FIG. 5.

In some examples, compute worker(s) 408 may handle the encoding of a media stream (e.g. media stream 208) into one or more encoded media streams (e.g., encoded media streams 214(1)-(N)). In at least one example, compute worker(s) 408 may each be responsible for one or more quality-based lanes (e.g., one or more Adaptive Bit Rate (ABR) lanes) of an encoding pipeline of live streaming system 400. For example, each of compute worker(s) 408 may handle the encoding of media stream 208 into one of encoded media streams 214, each of encoded media streams 214 having a different quality (e.g., resolution, bit rate, codec, etc.).

In some examples, live stream watcher 402 may perform real-time monitoring of incoming media streams. In some examples, live stream watcher 402 may aggregate various priority-determining metrics (e.g., metrics 210) of the media streams (e.g., watch time, viewer counts, viewer devices, viewer bandwidth) and may send signals to live encoding controller 404 to trigger addition or removal of lanes of the encoding pipeline dedicated to servicing the media streams.

In some examples, live encoding controller 404 may rank each media stream transmitted to live streaming system 400 based on priority-determining metrics (e.g., any statistics that may indicate an importance of the media stream to one or more users of live streaming system 400). For example, live encoding controller 404 may rank each media stream transmitted to live streaming system 400 based on a watch time of the media stream, a Concurrent View Count (CVC) of the media stream, a monetary value associated with the media stream (e.g., based on advertising revenue, boosted-content revenue, etc.). In some examples, live encoding controller 404 may decide which media streams transmitted to live streaming system 400 should have their encoding qualities increased or decreased, how qualities should be altered, and/or what costs are associated with the encoding qualities of the media streams. As mentioned above, live encoding controller 404 may use signals received from live stream watcher 402 to make its decisions. In some examples, priority levels 212 sent from live encoding controller 404 to live media processor 406 may represent priority or importance rankings associated with segments of media stream 208.

In some examples, live media processor 406 may dynamically orchestrate how an incoming media stream is encoded by compute worker(s) 408 by sending commands to compute worker(s) 408 to (1) add more encoding qualities (e.g., by providing necessary bit rate, resolution, and/or codec information) and/or (2) stop producing certain encoding qualities. In some examples, live media processor 406 and/or compute worker(s) 408 may store generated encodings to cache 410 (e.g., a distributed cache) and/or may transmit a signal to live delivery service 412 about changes to encoding qualities.

In some examples, live delivery service 412 may detect that the qualities of encoded media streams produced by live stream processor 406 and/or compute worker(s) 408 have changed and may prepare a manifest (e.g., an MPD) that appropriately reflects the new quality information of the encoded media streams. In some examples, live delivery service 412 may prepare a manifest that contains information describing the encoding lanes of a particular media stream along with a timeline when each is available. In this example, live media player 414 may switch to a different encoding lane after fetching an updated manifest with a newly added lane or after receiving a special error code when downloading a segment from a lane that has been removed. In other examples, live delivery service 412 may prepare a manifest that contains information describing a fixed number of encoding lanes of a media stream. In this example, live delivery service 412 may replace media segments of removed lanes in cache 410 with media segments of new lanes such that live media player 414 may access the media segments of the new lanes using at least the location information associated with the removed lanes.

Many other devices or subsystems may be connected to example system 100 in FIG. 1, example system 200 in FIG. 2, and/or example system 400. Conversely, all of the components and devices illustrated in FIG. 1, FIG. 2, and/or FIG. 4 need not be present to practice the embodiments described and/or illustrated herein. The devices and subsystems referenced above may also be interconnected in different ways from those shown in FIGS. 2 and 4. Example systems 100, 200, and/or 400 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 5:
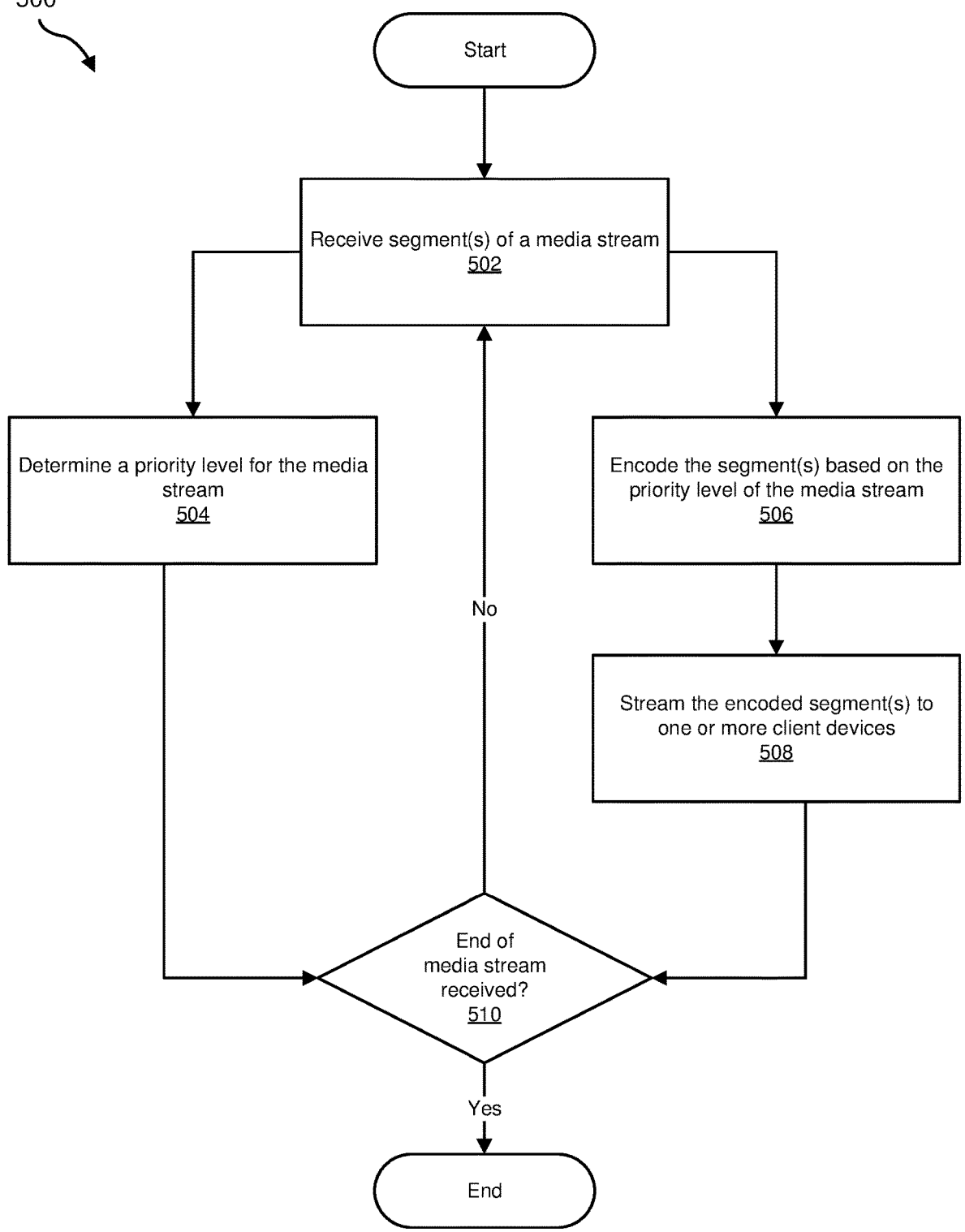
FIG. 5 is a flow diagram of an exemplary method for dynamically encoding media streams.

FIG. 5 is a flow diagram of an example computer-implemented method 500 for dynamically encoding media streams. The steps shown in FIG. 5 may be performed by any suitable computer-executable code and/or computing system, including system 100 in FIG. 1, system 200 in FIG. 2, system 400 in FIG. 4, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502, one or more of the systems described herein may receive segment(s) of a media stream. For example, receiving module 104 may, as part of server device 204, cause server device 204 to receive media stream 208 for encoding. Using FIG. 4 as an additional example, receiving module 104 may, as part of live media processor 406 in FIG. 4, receive segments of media stream 208 from a client device. Receiving module 104 may receive media streams in any suitable way.

At step 504, one or more of the systems described herein may determine a priority level for the media stream. For example, determining module 106 may, as part of server device 204 in FIG. 2, determine priority levels 212 for media stream 208. Using FIG. 4 as an additional example, determining module 106 may, as part of live encoding controller 404 in FIG. 4, determine priority levels 212 for media stream 208.

A priority level of a media stream may represent the media stream's current and/or future importance, value, significance, interest, engagement, usefulness, novelty, originality, etc. The disclosed systems may use the relative priority levels of a media stream and/or relative priority levels of other concurrent media streams in order to determine the amount or share of quality-influencing resources and/or costs (e.g., server-side encoding, storage, and/or streaming resources and/or costs) that are devoted and/or allocated to the media stream and/or the other concurrent media streams. For example, when a media stream's priority level is higher than that of other concurrent media streams, the disclosed systems may devote or allocate more quality-influencing resources and/or costs to the media stream and/or may devote or allocate less quality-influencing resources and/or costs to the concurrent media streams. Similarly, when a media stream's priority level is lower than that of other concurrent media streams, the disclosed systems may devote or allocate less quality-influencing resources and/or costs to the media stream and/or may devote or allocate more quality-influencing resources and/or costs to the concurrent media streams. In some examples, when new quality-influencing resources become available (e.g., when quality-influencing resources become cheaper), the disclosed systems may devote or allocate more of the new quality-influencing resources to media streams with higher priority levels and/or may devote or allocate less of the new quality-influencing resources to media streams with lower priority levels. Additionally or alternatively, when fewer quality-influencing resources are available (e.g., when quality-influencing resources become more expensive), the disclosed systems may devote or allocate a greater share of the remaining quality-influencing resources to media streams with higher priority levels and/or may devote or allocate a lesser share of the remaining quality-influencing resources to media streams with lower priority levels.

In some embodiments, the disclosed systems may determine a single relative priority level for a media stream, update the single relative priority level over time in response to changes to the metrics described herein, and encode the media stream according to the media stream's current and/or most recently determined relative priority level. Alternatively, the disclosed systems may determine multiple relative priority levels for a media stream, update the multiple relative priority levels over time in response to changes to their associated metrics, and encode the media stream according to one or more of the media stream's current and/or most recently determined relative priority levels. In some examples, the priority levels of a media stream may include a priority level of an encoding lane of the media stream and/or a priority level of an encoded media stream generated from the media stream. In these examples, the priority level may represent the encoding lane's or encoded media stream's current and/or future importance, value, significance, interest, engagement, usefulness, novelty, originality, etc. The disclosed systems may use the relative priority levels of encoding lanes and/or encoded media streams in order to determine the amount or share of quality-influencing resources and/or costs (e.g., server-side encoding, storage, and/or streaming resources and/or costs) that are devoted and/or allocated to the encoding lanes and/or encoded media streams. In some examples, the disclosed systems may use a priority of a media stream to determine a priority level of an encoding lane used to encode the media stream.

A priority level of a media stream may be based on and/or may reflect a variety of metrics. Determining module 106 may determine priority levels for a media stream based on (1) metrics associated with the creation and/or initial transmission of the media stream and/or other concurrent media streams, (2) metrics associated with the contents of the media stream and/or other concurrent media streams, (3) metrics associated with the encoding of the media stream and/or other concurrent media streams, (4) metrics associated with the storage of encoded media streams generated from the media stream and/or other concurrent media streams, (5) metrics associated with the streaming of the media stream and/or other concurrent media streams, (6) metrics associated with the client-side viewing of the media stream and/or other concurrent media streams, (7) metrics associated with the context and/or environment within which the media stream and/or other concurrent media streams are created and/or consumed, (8) metrics associated with accounts, policies, and/or agreements associated with the media stream and/or other concurrent media streams, (9) metrics associated with the economic values of the media stream and/or other concurrent media streams, (10) metrics associated with video-on-demand storage, streaming and/or viewing of the media stream and/or other concurrent media streams, (11) variations or combinations of one or more of the same, or (12) any other suitable type or form of priority influencing metric or statistic.

In some examples, determining module 106 may determine a higher priority level for a higher quality media stream and/or a lower priority level for a lower quality media stream, especially when the two media streams contain the same or similar content. For example, determining module 106 may determine higher priority levels for media streams generated using devices associated with higher quality and/or lower priority levels for media streams generated using device associated with low quality. In another example, determining module 106 may determine higher priority levels for stable media streams and/or lower priority levels for unstable media streams. For example, if the disclosed systems receive two live streams from the same event (one from a latest-generation smartphone, and one from a smartphone from several generations ago), determining module 106 may determine a higher priority level for the live stream captured by the latest-generation smartphone and a lower priority level for the live stream captured by the older-generation smartphone. In response to the higher priority level, the disclosed systems may generate more encodings of the live stream from the latest-generation smartphone and/or encodings with greater bit rates and/or resolutions. In response to the lower priority level of the older-generation's live stream, the disclosed systems may generate less encodings of the live stream from the older-generation smartphone and/or encodings with lower bit rates and/or resolutions. In some examples, determining module 106 may determine higher priority levels for media streams ingested over higher quality network connections (e.g., high-bandwidth connections, stable connections, etc.) and/or lower priority levels for media streams ingested over lower quality network connections (e.g., low-bandwidth connections, unreliable connections, etc.).

In some examples, the disclosed systems may enable creators and/or viewers of a media stream to indicate the priority level of the media stream over time, and determining module 106 may use these indications to determine the media stream's priority level. For example, if a creator or viewer indicates that a certain portion of a media stream has a relatively greater importance, determining module 106 may give that portion of the media stream a greater priority level. Similarly, if a creator or viewer indicates that a certain portion of a media stream has a relatively lower importance, determining module 106 may give that portion of the media stream a lower priority level. In some examples, a media stream's creator and/or consumer may indicate that the media stream has a relatively greater importance by indicating that the media stream is currently important at the same time that another media stream's creator and/or consumer either (1) does not indicate that the other media stream is currently important and/or (2) indicates that the other media stream is not currently important. In such examples, the disclosed systems may (1) generate more encodings of the media stream and/or encodings of the media stream with greater bit rates and/or resolutions and/or (2) generate less encodings of the other media stream and/or encodings of the other media stream with lesser bit rates and/or resolutions. In at least one example, the disclosed systems may cause server-side resource utilization to remain substantially unchanged by giving a relatively higher priority level to the media stream while simultaneously giving a relatively lower priority level to the other media stream.

In some examples, determining module 106 may use a suitably trained machine-learning model to detect the content (e.g., a person, object, location, scene, event, etc.) contained within a media stream and/or may rely on indications from creators and/or viewers. Determining module 106 may then use information about the content to update the priority level for the media stream. In some examples, determining module 106 may determine higher priority levels for media streams containing important, valuable, significant, exciting, interesting, engaging, useful, novel, and/or original content. For example, determining module 106 may determine a higher priority level for a media stream conveying a sporting event when crowd noise or cheers are present, when the sporting event has a close score, when the sporting event is at a critical or interesting juncture (e.g., a start of the event or an end of a period). Determining module 106 may also determine a lower priority level for the media stream conveying the sporting event when crowd noise or cheers are low or not present, when the sporting event is a blowout, and/or when the sporting event is at a non-critical or uninteresting juncture (e.g., a timeout or halftime).

In some examples, determining module 106 may determine a higher priority level for a media stream that consumes fewer transcoding and/or encoding resources (e.g., CPU, memory, and/or network resources) and/or a lower priority level for a media stream that consumes more transcoding and/or encoding resources, especially when the two media streams contain the same or similar content. In some examples, determining module 106 may determine a higher priority level for a media stream that consumes fewer storage resources and/or a lower priority level for a media stream that consumes more storage resources, especially when the two media streams contain the same or similar content. In some examples, determining module 106 may determine a higher priority level for a media stream that consumes fewer network resources and/or a lower priority level for a media stream that consumes more network resources, especially when the two media streams contain the same or similar content.

Determining module 106 may determine priority levels based on various client-side metrics, which may be aggregated across all viewers and/or consumers. In some examples, determining module 106 may determine a priority level for a media stream based on the number of concurrent viewers of the media stream and/or the number of concurrent viewers of other concurrent media streams. For example, determining module 106 may determine a higher priority level for any media stream with a relatively higher number of concurrent viewers and a lower priority level for any media stream with a relatively lower number of concurrent viewers. In some examples, determining module 106 may determine a priority level for a media stream based on the client-side engagement of the media stream and/or the client-side engagement of other concurrent media streams. For example, determining module 106 may determine a higher priority level for any media stream with a relatively higher engagement and a lower priority level for any media stream with a relatively lower engagement. In at least one example, determining module 106 may determine client-side engagement based on total watch time, based on whether a media stream is being played on an element of a graphical user interface that is viewable or in focus, based on whether a viewer is interacting with the media stream (e.g., by typing in an associated text box, by speaking in an associated audio stream, and/or by causing motion in an associated video stream), and/or based on whether eye-tracking data indicates the media stream is currently being viewed.

In some examples, determining module 106 may determine a priority level for a media stream based on a measure of client-side resources. For example, determining module 106 may determine a priority level for a media stream based on whether client-side devices have sufficient resolution, frame rates, processing power, memory, bandwidth, and/or codec support to consume higher quality versions of the media stream. In another example, determining module 106 may determine a higher priority level for a media stream when client devices are capable of consuming the media stream at qualities, bit rates, resolutions, and/or codecs not yet available and/or may determine a lower priority level for a media stream when its encodings are not being consumed or accessed above a predetermined threshold amount.

In some examples, determining module 106 may use a suitably trained machine-learning model to detect a context and/or an environment associated with a media stream and/or may rely on indications from creators and/or viewers.

In some examples, determining module 106 may determine higher priority levels for media streams with important, valuable, significant, exciting, interesting, engaging, useful, novel, and/or original contexts and/or environments. For example, determining module 106 may determine a higher priority level for a media stream captured from a unique location or environment and/or may determine a lower priority level for any media streams captured from a common location or environment, especially when compared to other concurrent media streams. In at least one example, determining module 106 may determine a higher priority level for media streams with greater historical and/or forensic importance.

In some examples, determining module 106 may determine priority levels for a media stream based on a variety of metrics associated with the accounts, policies (e.g., Quality of Service (QOS) or Quality of Experience (QOE) policies), and/or agreements associated with the media stream and/or other concurrent media streams. In some examples, determining module 106 may determine a priority level for a media stream based on a social-media account associated with the media stream. For example, determining module 106 may determine a higher priority level for any media stream produced by an account with a relatively high number of followers and/or for any media stream consumed by an account with a relatively high number of followers. In other examples, determining module 106 may determine a priority level for a media stream based on a value exchange. For example, determining module 106 may determine a higher priority level for any media stream containing a paid advertisement and/or for any media stream for which money has been exchanged for higher quality encoding of the media stream. Alternatively, determining module 106 may determine a lower priority level for any media stream not containing a paid advertisement and/or for any media stream for which money has been not been exchanged for higher quality encoding of the media stream. In some examples, determining module 106 may determine a higher priority level for any media stream that is more likely to generate revenue (e.g., media streams containing content that will likely attract and or support subscription purchases and/or advertisement views). Alternatively, determining module 106 may determine a lower priority level for any media stream containing content that will likely not attract and/or support subscription purchases and/or advertisement views.

At step 506, one or more of the systems described herein may encode the segment(s) of a media stream based on the priority level of the media stream. For example, encoding module 108 may, as part of server device 204 in FIG. 2, generate encoded segments 304(1)-(N) from segments 302(1)-(N) of media stream 208 at qualities 306(1)-(N) based on priority levels 212(1)-(N), respectively. Using FIG. 4 as an additional example, encoding module 108 may, as part of live media processor service 406 and/or compute worker(s) 408 in FIG. 4, generate encoded segments of encoded media stream(s) 214 based on priority levels 212. The systems disclosed herein may use a suitable encoding, transcoding, or downsampling tool or application to encode segments of a media stream.

In some embodiments, encoding module 108 may, as part of a single lane of an encoding pipeline, encode incoming segments of a media stream at a set quality, bit rate, resolution, and/or codec for as long as the media stream has a particular priority level and/or for as long as the lane has a higher priority level relative to that of other lanes that are also encoding the incoming segments of the media stream. In such examples, encoding module 108 may stop encode incoming segments of the media stream at the set quality, bit rate, resolution, and/or codec when the media stream's priority level drops or changes. Additionally, encoding module 108 may begin encoding incoming segments of the media stream at the set quality, bit rate, resolution, and/or codec whenever the media stream's priority level increases above the particular priority level.

In some embodiments, encoding module 108 may encode incoming segments of a media stream at varying qualities, bit rates, resolutions, and/or codecs based on variations to the media stream's priority level. For example, encoding module 108 may encode incoming segments of a media stream at lower qualities, at lower bit rates, at lower resolutions, and/or using lower-quality codecs in response to drops in the media stream's priority level. Encoding module 108 may encode incoming segments of a media stream at higher qualities, at higher bit rates, at higher resolutions, and/or using higher-quality codecs in response to increases to the media stream's priority level.

In some examples, encoding module 108 may encode segments of a high priority media stream to maximize or improve perceived quality. For example, encoding module 108 may encode one or more segments of a video stream at a resolution and/or a bit rate that minimizes overall distortion of the scene and/or maximizes overall perceived quality for a particular bit rate. In some embodiments, the term "bit rate" may refer to the rate of data transfer over a network or digital connection. In these embodiments, a bit rate may be expressed as the number of bits transmitted per second, such as megabits per second (Mbps). Additionally, a bit rate may represent a network bandwidth (e.g., a current or available network bandwidth between server device 204 and one of client device(s) 206) and/or an expected speed of data transfer for videos over a network (e.g., an expected speed of data transfer for videos over a network that connects server device 204 to one of client device(s) 206).

In some examples, encoding module 108 may choose one or more suitable codecs for encoding segments of a media stream based on the media stream's priority level. Additionally, encoding module 108 may choose different codecs for encoding segments of a media stream in responses to changes to the media stream's priority level. Encoding module 108 may choose a suitable codec in a variety of ways. For example, encoding module 108 may choose, in response to a reduction of a media stream's priority level, a more efficient codec to encode the media stream's segments even if the resulting encoded segments have a lower quality than prior segments encoded with a less efficient codec. In other examples, encoding module 108 may choose, in response to an increase of a media stream's priority level, a less efficient codec to encode the media stream's segments if the resulting encoded segments have a higher quality than prior segments encoded with a more efficient codec.

In some examples, encoding module 108 may choose a suitable codec for encoding segments of a media stream based on the priority levels of the media stream and additional server-side and/or client-side metrics. For example, encoding module 108 may choose, in response to an improvement of a media stream's priority level, a less efficient or more resource hungry codec to encode the media stream's segments if the resulting encoded segments have a higher quality than prior segments encoded with a less efficient codec and/or if the resulting encoded segments are decoded more efficiently at client-side devices. Alternatively, encoding module 108 may choose, in response to a reduction of a media stream's priority level, a more efficient or less resource hungry codec to encode a media stream's segments even if the resulting encoded segments have a lower quality than prior segments encoded with a more efficient codec and/or even if the resulting encoded segments are decoded less efficiently at client-side devices.

In some examples, encoding module 108 may choose a suitable codec for encoding segments of a media stream based on the priority levels of the media stream and additional client-side metrics. For example, encoding module 108 may choose, in response to an improvement of a media stream's priority level, a codec to encode the media stream's segments even if the resulting encoded segments are decoded more efficiently at client-side devices. In other examples, encoding module 108 may choose, in response to an improvement of a media stream's priority level, an additional codec to encode the media stream's segments to give user's and/or their devices more options from which to choose. In other examples, encoding module 108 may choose, in response to an increase of a media stream's priority level, a less efficient codec to encode the media stream's segments if the resulting encoded segments have a higher quality than prior segments encoded with a more efficient codec.

In live streaming systems, storing module 112 may store encoded segments of a live media stream to a temporary memory cache from which client devices may access the live media stream in real time. Additionally or alternatively, storing module 112 may store encoded segments of the live media stream to long-term storage. In at least some examples, storing module 112 may store encoded segments of the live media stream to long-term storage only when the priority of the live media stream is above a predetermined threshold value. In some examples, storing module 112 may store, to long-term storage, only the highest quality encoded segments of the live media stream and/or only the encoded segments of the live media stream that are most likely to be viewed on demand at a later time (e.g., to reduce storage costs). In some circumstances, a high priority level may indicate that portions of the live media stream (e.g., sporting highlights) will likely be viewed on demand at a later time.

At step 508, one or more of the systems described herein may stream the encoded segment(s) to one or more client devices. For example, streaming module 110 may, as part of server device 204 in FIG. 2, stream encoded segments 304(1)-(N) of media stream 208 to client device(s) 206. Using FIG. 4 as an additional example, streaming module 110 may, as part of live delivery service 412 in FIG. 4, stream encoded segments of media stream 208 to live media player 414.

Streaming module 110 may stream encoded segments of a media stream to client devices in a variety of ways. In some examples, streaming module 110 may stream a media stream to client devices using a suitable adaptive bit rate streaming technology. In at least one example, streaming module 110 may utilize a Hypertext Transfer Protocol (HTTP) based adaptive streaming technology that uses a combination of encoded media files and manifest files (e.g., Media Presentation Descriptions (MPDS)) that identify alternative streams and their respective Uniform Resource Locators (URLs).

In some examples, streaming module 110 may utilize multiple bit rates to stream a video to one or more client devices, for example, in order to accommodate or adapt to changes in available server-side or client-side resources (e.g., delivery bandwidth and/or CPU processing power), to accommodate for differences in available client-side resources, and/or to accommodate for user-selected bit rates. In some embodiments, streaming module 110 may stream a video to a client device at a first bit rate and a second bit rate by streaming a first portion of an associated encoded video having an overall bit rate equal to the first bit rate and by streaming another portion of another associated encoded video having an overall bit rate equal to the second bit rate.

Likewise, streaming module 110 may utilize multiple resolutions to stream a video to one or more client devices, for example, in order to accommodate or adapt to changes in available server-side or client-side resources, to accommodate for differences in available client-side resources, and/or to accommodate for user-selected resolutions. In some embodiments, streaming module 110 may stream a video to a client device at a first resolution and a second resolution by streaming a first portion of an associated encoded video having a resolution equal to the first resolution and by streaming another portion of another associated encoded video having a resolution equal to the second resolution.

In at least one embodiment, streaming module 110 may utilize multiple codecs to stream a video to one or more client devices, for example, in order to accommodate or adapt to changes in available server-side or client-side resources, to accommodate for differences in available client-side resources, and/or to accommodate for user-selected codec. In some embodiments, streaming module 110 may stream a video to a client device at a first codec and a second codec by streaming a first portion of an associated encoded video having been encoded by the first codec and by streaming another portion of another associated encoded video having been encoded by the second codec.

In some embodiments, streaming module 110 may notify client devices of the various qualities, bit rates, resolutions, and/or codecs at which a media stream is available to be streamed and/or may notify client devices of changes to the various qualities, bit rates, resolutions, and/or codecs at which a media stream is available to be streamed. In one example, streaming module 110 may generate a manifest or list of the various qualities, bit rates, resolutions, and/or codecs at which a media stream is available to be streamed and may transmit the manifest to one or more client devices. The one or more client devices may then use the manifest to select an available quality, bit rate, resolution, and/or codec at which to consume the media stream.

In some examples, streaming module 110 may update a manifest or list in response to any changes to the qualities, bit rates, resolutions, and/or codecs at which a media stream is available to be streamed. In one example, streaming module 110 may actively notify client devices of any changes and/or may allow the client devices to discover the changes via the updated manifest. In some examples, client devices may periodically access a manifest associated with a media stream to discover any changes to the qualities, bit rates, resolutions, and/or codecs at which a media stream is available to be streamed. Additionally or alternatively, the client devices may access a manifest associated with a media stream to discover changes whenever the client devices' current quality, bit rate, resolution, and/or codec becomes unavailable. In some examples, streaming module 110 may utilize a suitable bit rate adaptation (ABR) algorithm that enables client devices to automatically select from amongst encoded segment(s) of a media stream with the highest bit rate possible that can be downloaded in time for playback without causing stalls or re-buffering events during playback.

It should be appreciated that step 504 and steps 506 and 508 may be performed in any order, in series, or in parallel. Additionally, step 504 and steps 506 and 508 may be performed by the same device or by multiple devices. For example, step 504 may be performed by live encoding controller 404 in FIG. 4, step 506 may be performed by live media processor 406 and/or compute worker(s) 408, and step 508 may be performed by live delivery service 412 and/or live media player 414. At step 510, exemplary method 500 in FIG. 5 may terminate upon receiving the end of a media stream.

Figure 6:
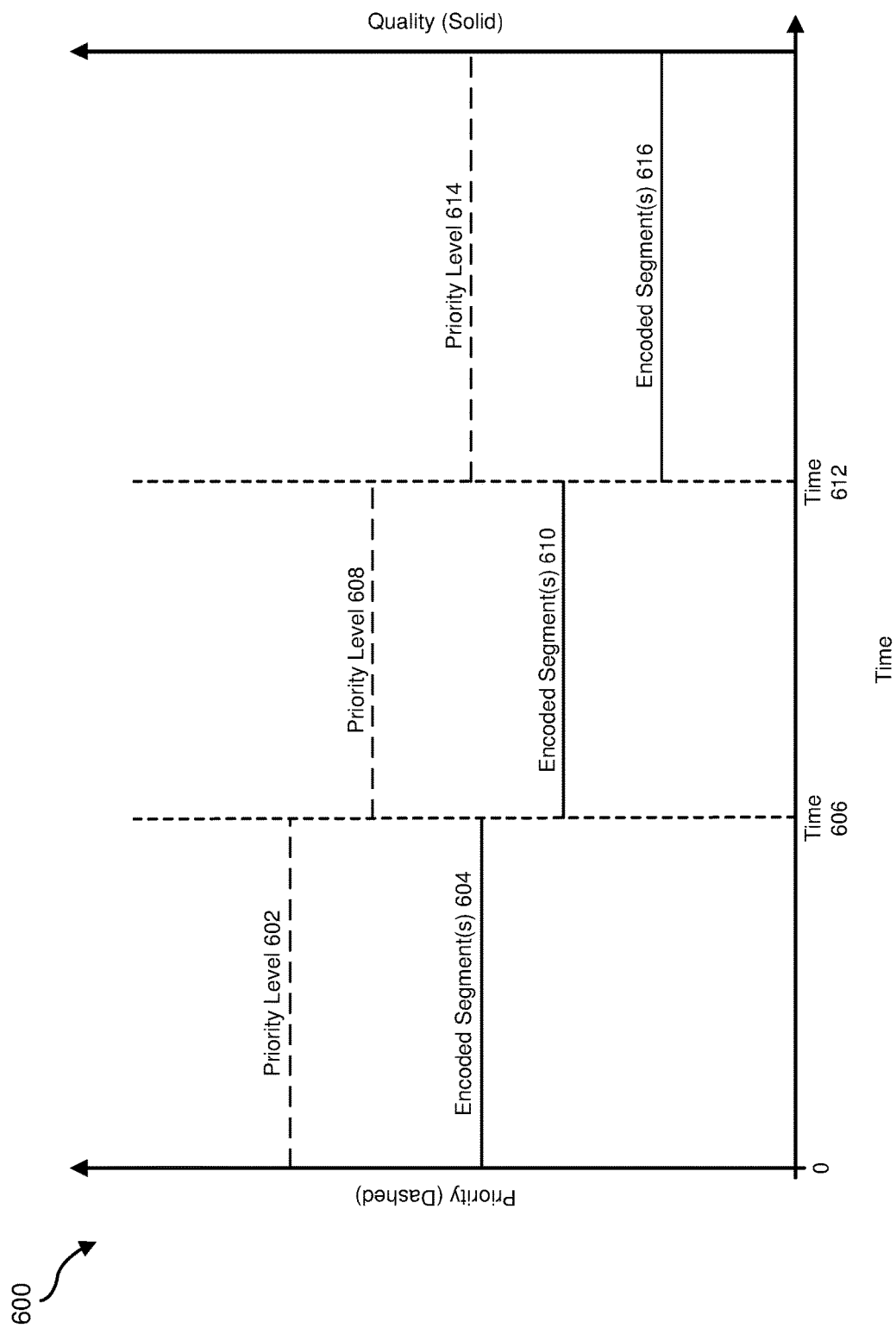
FIG. 6 is a diagram of exemplary priority levels of an exemplary media stream and exemplary qualities of corresponding exemplary encoded segments plotted over time.
Figure 7:
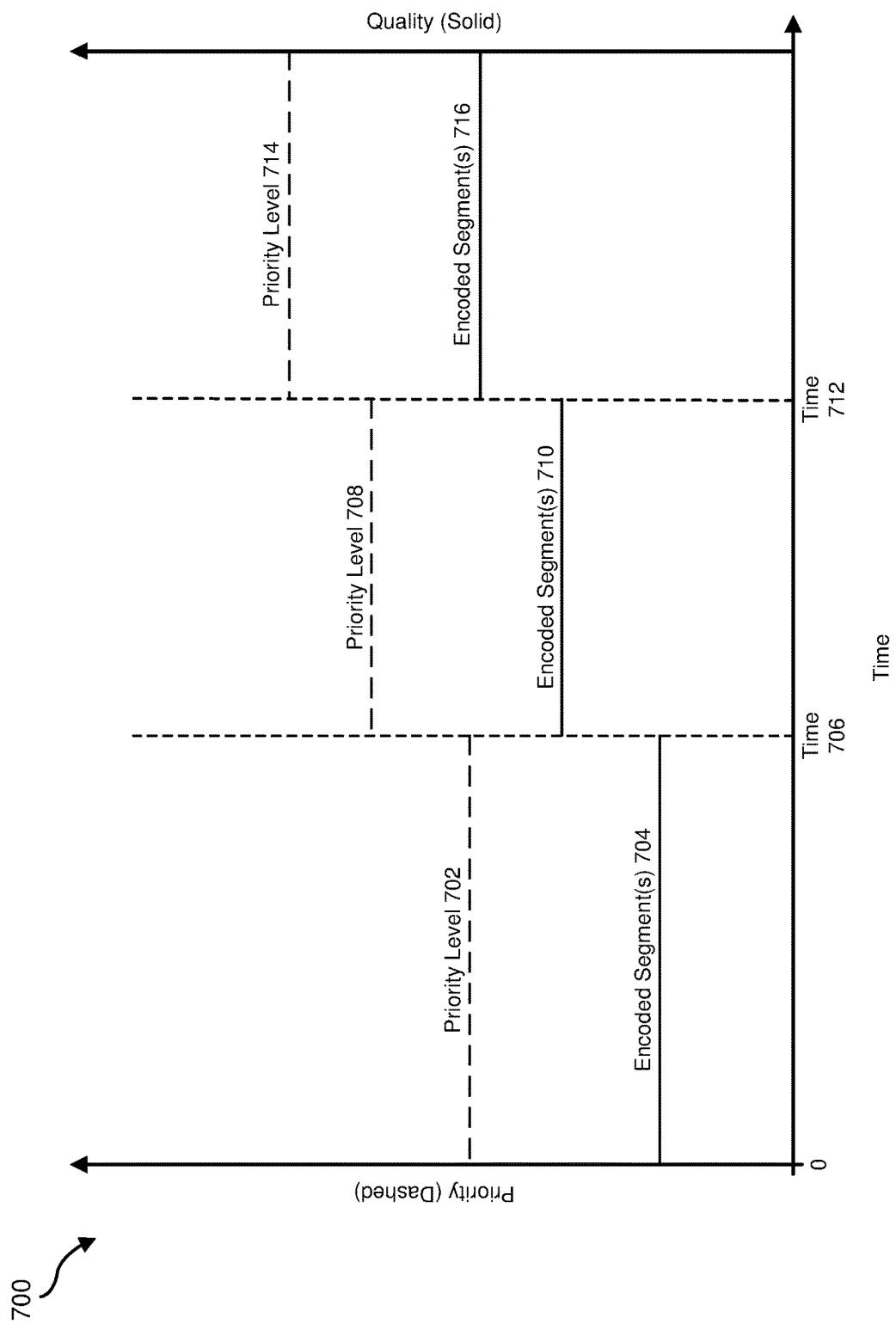
FIG. 7 is a diagram of exemplary priority levels of an exemplary media stream and exemplary qualities of corresponding exemplary encoded segments plotted over time.

FIGS. 6-13 provide examples of how the disclosed systems may decrease and/or increase the quality of one or more of a media stream's associated encoded media stream(s) based on changes to the media stream's priority level over time. FIGS. 6 and 7 provide examples of how the disclosed systems may decrease or increase the quality of a single encoded media stream of a media stream based on decreases or increases to the media stream's priority level over time. FIG. 6 is an exemplary diagram 600 of exemplary decreasing priority levels of media stream 208 and the exemplary qualities of its corresponding exemplary encoded media stream 214 plotted over time. In this example, the disclosed systems may determine, at time 0, an initial priority level 602 for media stream 208 and may generate, based on initial priority level 602, at least one encoded media stream 214, illustrated as encoded segment(s) 604. At time 606, the disclosed systems may determine a lower priority level 608 for media stream 208 in response to changes to metrics 210 and may reduce, based on lower priority level 608, the quality of encoded media stream 214 after time 606, illustrated here as encoded segment(s) 610. At time 612, the disclosed systems may determine another lower priority level 614 for media stream 208 based on additional changes to metrics 210 and may further reduce, in response to lower priority level 614, the quality of encoded media stream 214 after time 612, illustrated here as encoded segment(s) 616.

FIG. 7 is an exemplary diagram 700 of exemplary increasing priority levels of media stream 208 and the exemplary qualities of its corresponding exemplary encoded media stream 214 plotted over time. In this example, the disclosed systems may determine, at time 0, an initial priority level 702 for media stream 208 and may generate, based on initial priority level 702, at least one encoded media stream 214, illustrated as encoded segment(s) 704. At time 706, the disclosed systems may determine a higher priority level 708 for media stream 208 based on changes to metrics 210 and may increase, in response to higher priority level 708, the quality of encoded media stream 214 after time 706, illustrated here as encoded segment(s) 710. At time 712, the disclosed systems may determine another higher priority level 714 for media stream 208 based on additional changes to metrics 210 and may further increase, in response to higher priority level 714, the quality of encoded media stream 214 after time 712, illustrated here as encoded segment(s) 716.

Figure 8:
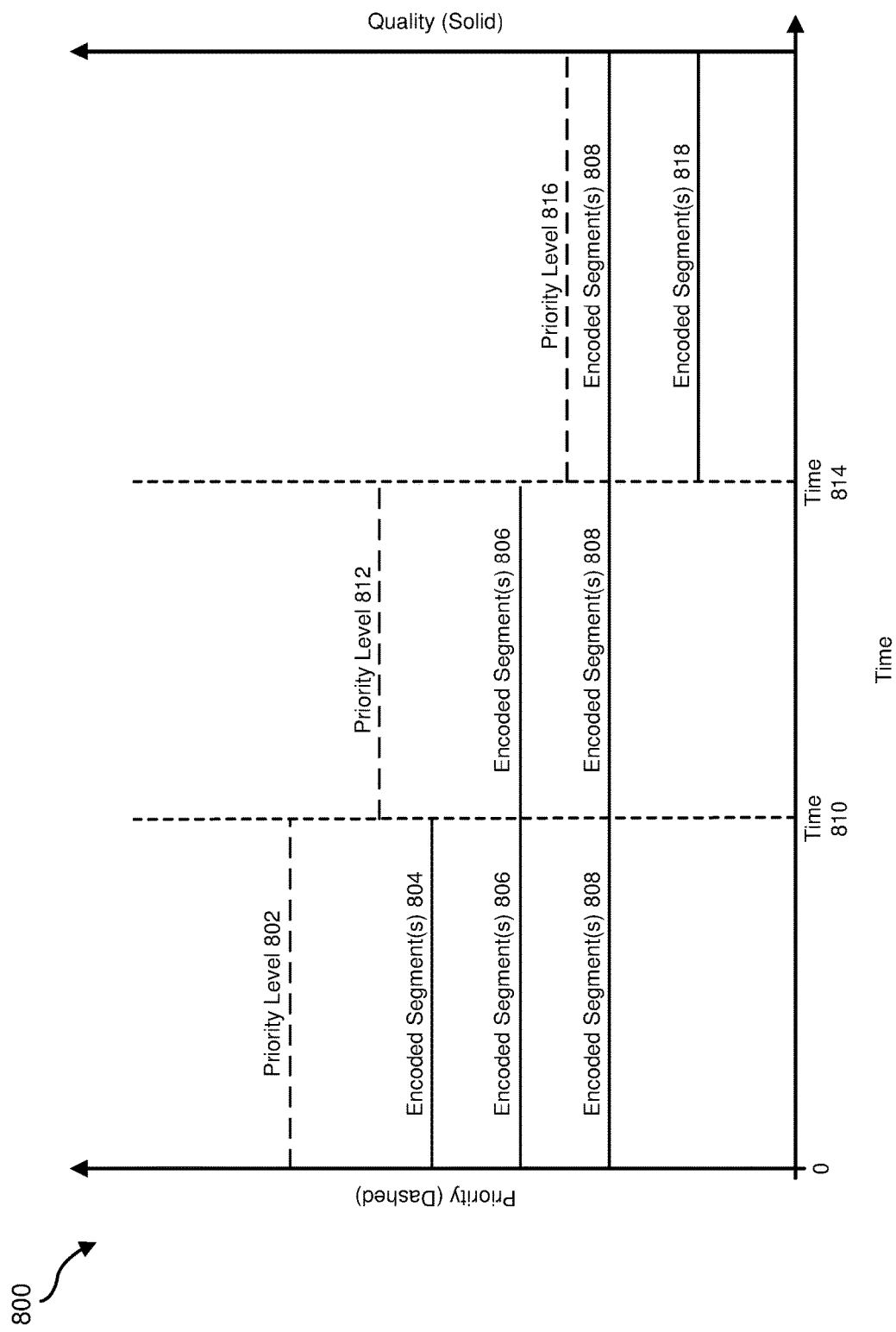
FIG. 8 is a diagram of exemplary priority levels of an exemplary media stream and exemplary qualities of corresponding exemplary encoded segments plotted over time.
Figure 9:
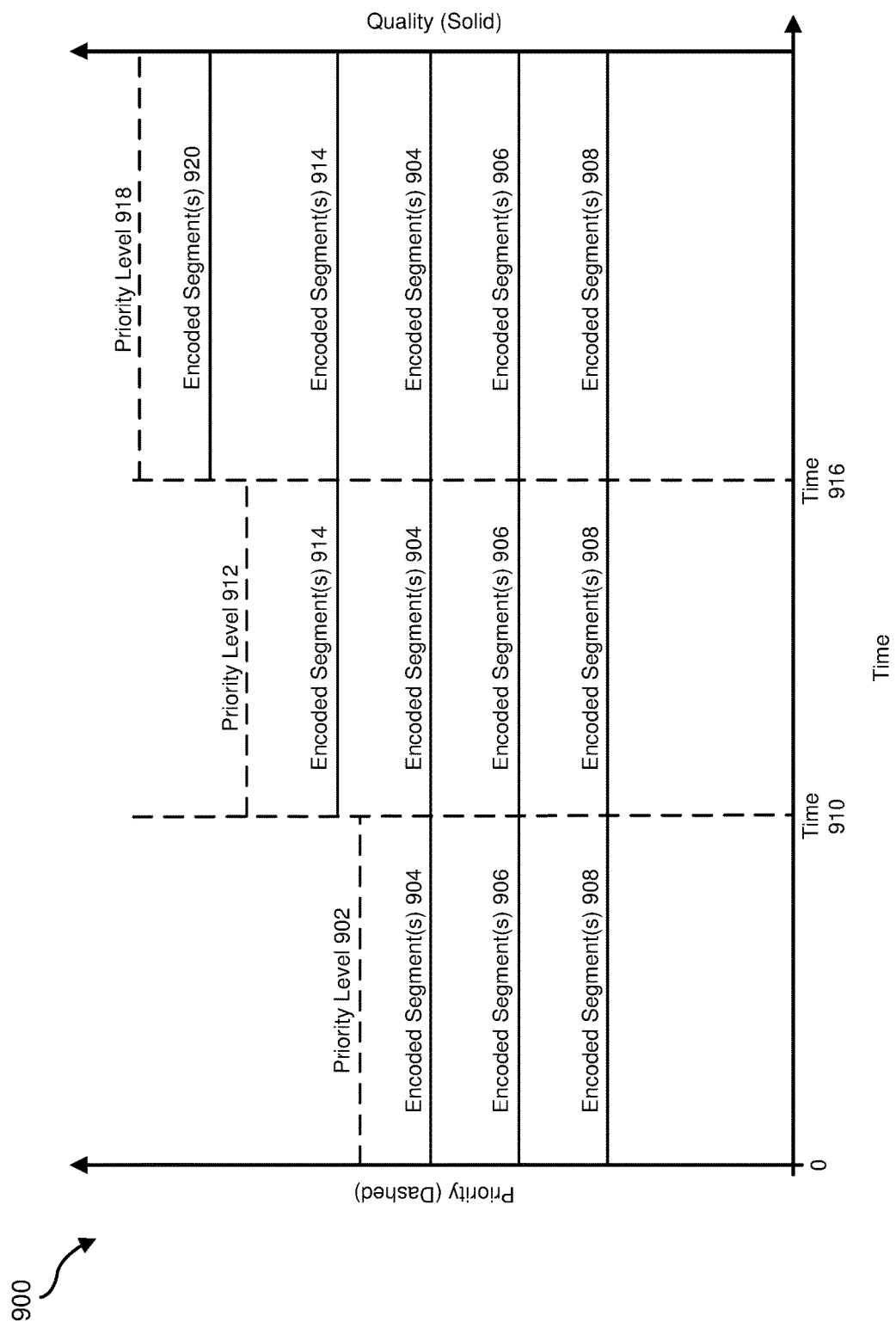
FIG. 9 is a diagram of exemplary priority levels of an exemplary media stream and exemplary qualities of corresponding exemplary encoded segments plotted over time.
Figure 10:
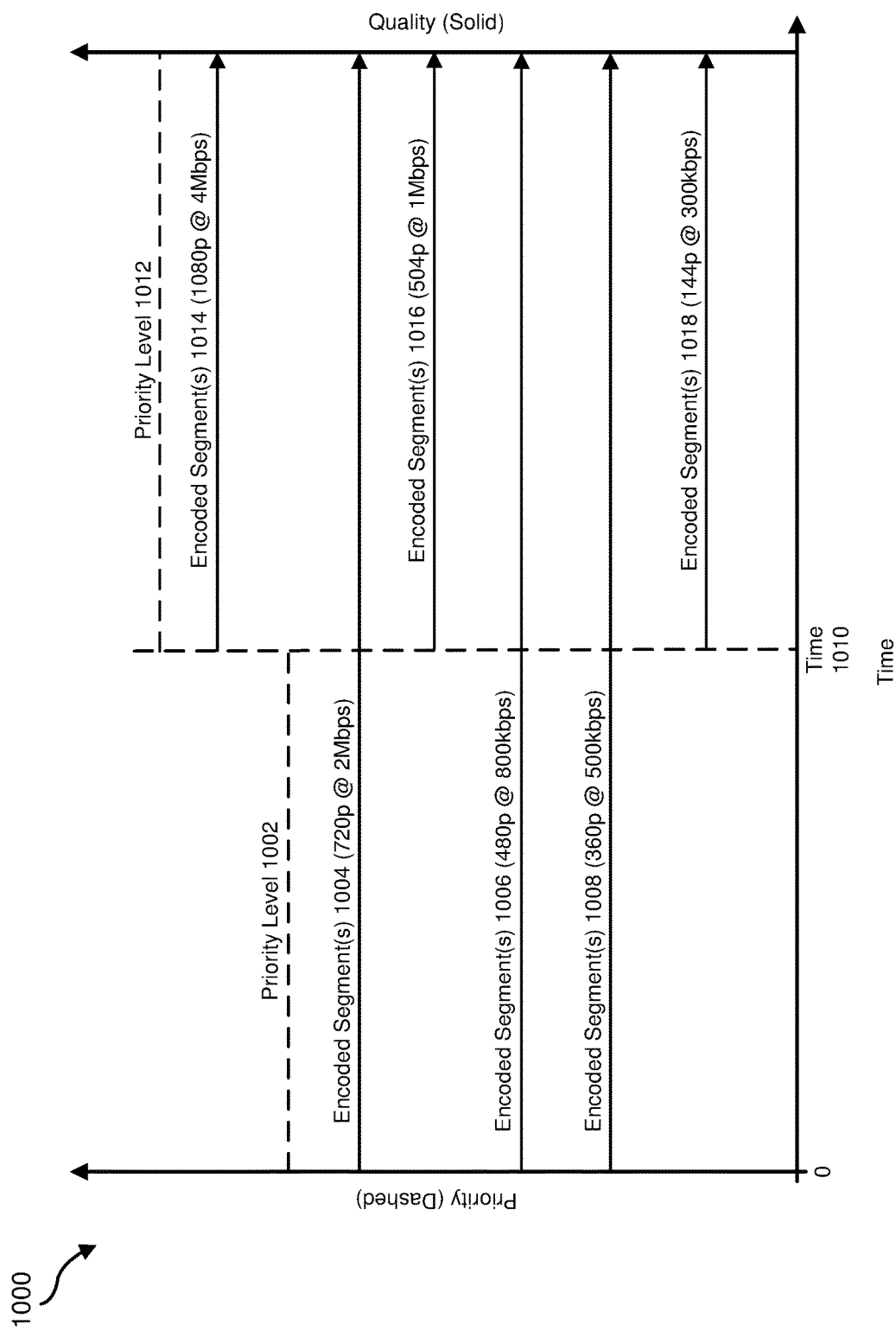
FIG. 10 is a diagram of exemplary priority levels of an exemplary media stream and exemplary qualities of corresponding exemplary encoded segments plotted over time.

FIGS. 8-10 provide examples of how the disclosed systems may decrease or increase the overall quality of a media stream's associated encoded media streams based on decreases or increases to the media stream's priority level over time. FIG. 8 is an exemplary diagram 800 of exemplary decreasing priority levels of media stream 208 and the exemplary qualities of its corresponding exemplary encoded media streams 214 plotted over time. In this example, the disclosed systems may determine, at time 0, an initial priority level 802 for media stream 208 and may generate, based on initial priority level 802, three encoded media streams 214(1)-(3), illustrated as encoded segment(s) 804, encoded segment(s) 806, encoded segment(s) 808, respectively. At time 810, the disclosed systems may determine a lower priority level 812 for media stream 208 in response to changes to metrics 210 and may reduce, based on lower priority level 812, the quality of encoded media streams 214 after time 806 by eliminating encoded media stream 214(1), which had the highest quality amongst encoded media streams 214(1)-(3). At time 814, the disclosed systems may determine another lower priority level 816 for media stream 208 based on additional changes to metrics 210 and may further reduce, in response to lower priority level 816, the quality of encoded media streams 214 after time 816 by eliminating encoded media stream 214(2), which had the highest quality amongst encoded media streams 214(2)-(3) and by generating an additional encoded media stream 214(4) (illustrated here as encoded segment(s) 818) having a quality lower than that of encoded media stream 214(2).

FIG. 9 is an exemplary diagram 900 of exemplary increasing priority levels of media stream 208 and the exemplary qualities of its corresponding exemplary encoded media streams 214 plotted over time. In this example, the disclosed systems may determine, at time 0, an initial priority level 902 for media stream 208 and may generate, based on initial priority level 902, three encoded media streams 214(1)-(3), illustrated as encoded segment(s) 904, encoded segment(s) 906, encoded segment(s) 908, respectively. At time 910, the disclosed systems may determine a higher priority level 912 for media stream 208 in response to changes to metrics 210 and may increase, based on higher priority level 912, the quality of encoded media streams 214 after time 906 by generating an additional encoded media stream 214(4) (illustrated as encoded segment(s) 914), which has a higher quality than that of any of encoded media streams 214(1)-(3). At time 916, the disclosed systems may determine another higher priority level 918 for media stream 208 based on additional changes to metrics 210 and may further increase, in response to higher priority level 918, the quality of encoded media streams 214 after time 918 by generating an additional encoded media stream 214(5) (illustrated as encoded segment(s) 920), which has a higher quality than that of any of encoded media streams 214(1)-(4). While, in this example, encoded media streams 214(4)-(5) had qualities greater than those of encoded media streams 214(1)-(3), the disclosed systems may have increased the overall quality of encoded media streams 214 by generating additional encoded media streams at any quality level.

FIG. 10 is an exemplary diagram 1000 of exemplary increasing priority levels of media stream 208 and the exemplary qualities of its corresponding exemplary encoded media streams 214 plotted over time. In this example, the disclosed systems may determine, at time 0, an initial priority level 1002 for media stream 208 and may generate, based on initial priority level 1002, three encoded media streams 214(1)-(3), illustrated as encoded segment(s) 1004, encoded segment(s) 1006, encoded segment(s) 1008, respectively. At time 1010, the disclosed systems may determine a higher priority level 1012 for media stream 208 in response to changes to metrics 210 and may increase, based on higher priority level 1012, the quality of encoded media streams 214 after time 1010 by generating three additional encoded media streams 214(4)-(6). In this example, the disclosed systems may generate encoded media stream 214(4) with a quality higher than that of encoded media stream 214(1), illustrated as encoded segment(s) 1014. Additionally, the disclosed systems may generate encoded media stream 214(5) with a quality between the qualities of encoded media streams 214(1) and 214(2), illustrated as encoded segment(s) 1016. Additionally, the disclosed systems may generate encoded media stream 214(6) with a quality lower than the qualities of any of encoded media streams 214(1)-(3), illustrated as encoded segment(s) 1018.

In one example, exemplary diagram 1000 may illustrate the encoding qualities associated with a soccer live stream. In this example, the disclosed systems may ingest the soccer live stream at 1080p and 10 Mbps and may generate three encoded video streams (e.g., encoded segment(s) 1004, encoded segment(s) 1006, and encoded segment(s) 1008) at 720p and 2 Mbps, 480p and 800 kbps, and 360p and 500 kbps, respectively, based on an initial priority level 1002. In this example, the soccer match may have become more interesting at time 1010 and there may be a significantly larger number of viewers than at time 0. For example, at time 1010 there may be millions of viewers watching the soccer match on big-screen televisions as well as a variety of mobile devices that support different codecs and resolutions. In response to these factors, the disclosed systems may increase the priority level of the soccer match from priority level 1002 to priority level 1012. Furthermore, the disclosed systems may generate three additional encoded video streams (e.g., encoded segment(s) 1014, encoded segment(s) 1016, and encoded segment(s) 1018) at 1080p and 4 Mbps, 504p and 1 Mbps, and 144p and 300 kbps, respectively, based on updated priority level 1012.

Figure 11:
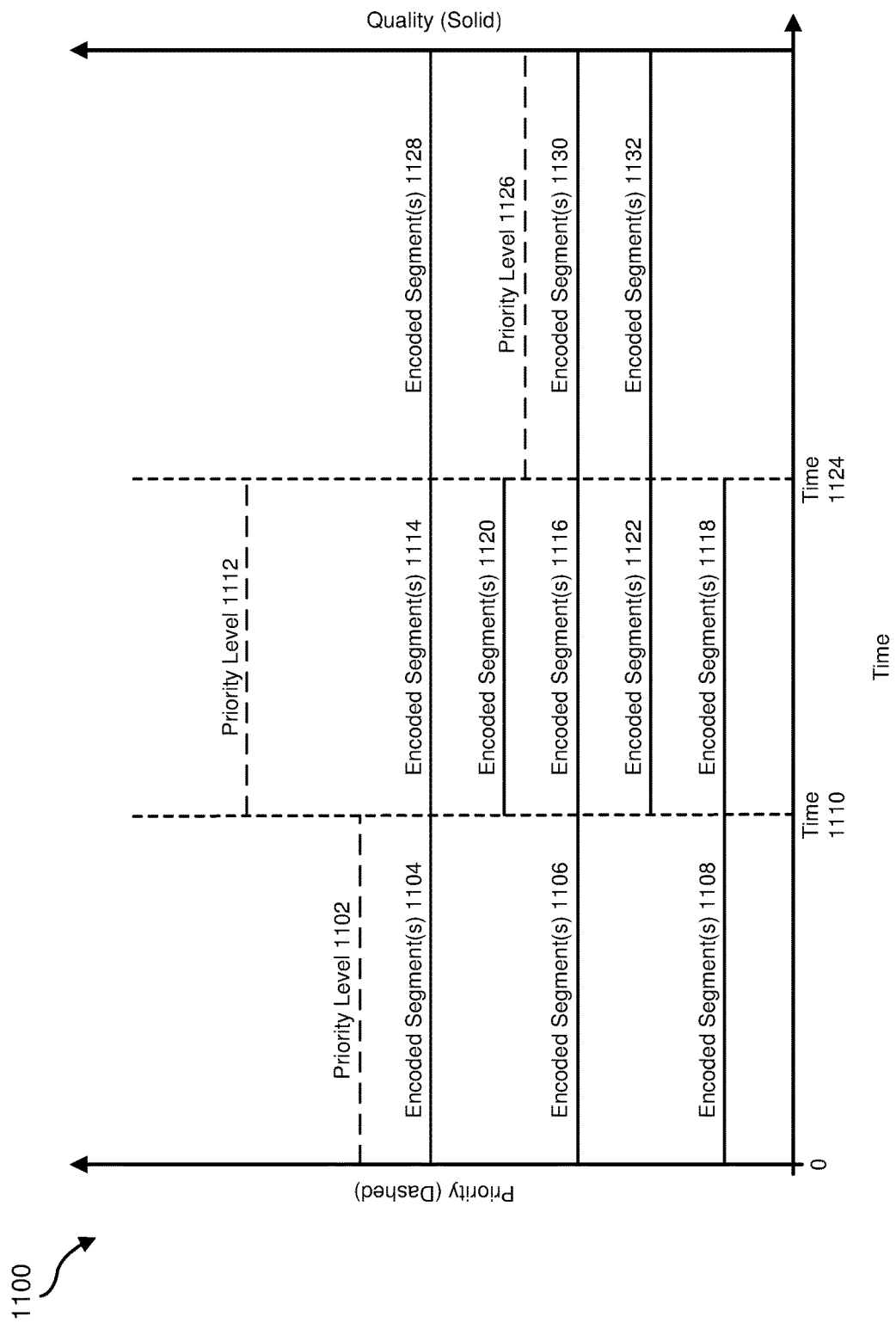
FIG. 11 is a diagram of exemplary priority levels of an exemplary media stream and exemplary qualities of corresponding exemplary encoded segments plotted over time.
Figure 12:
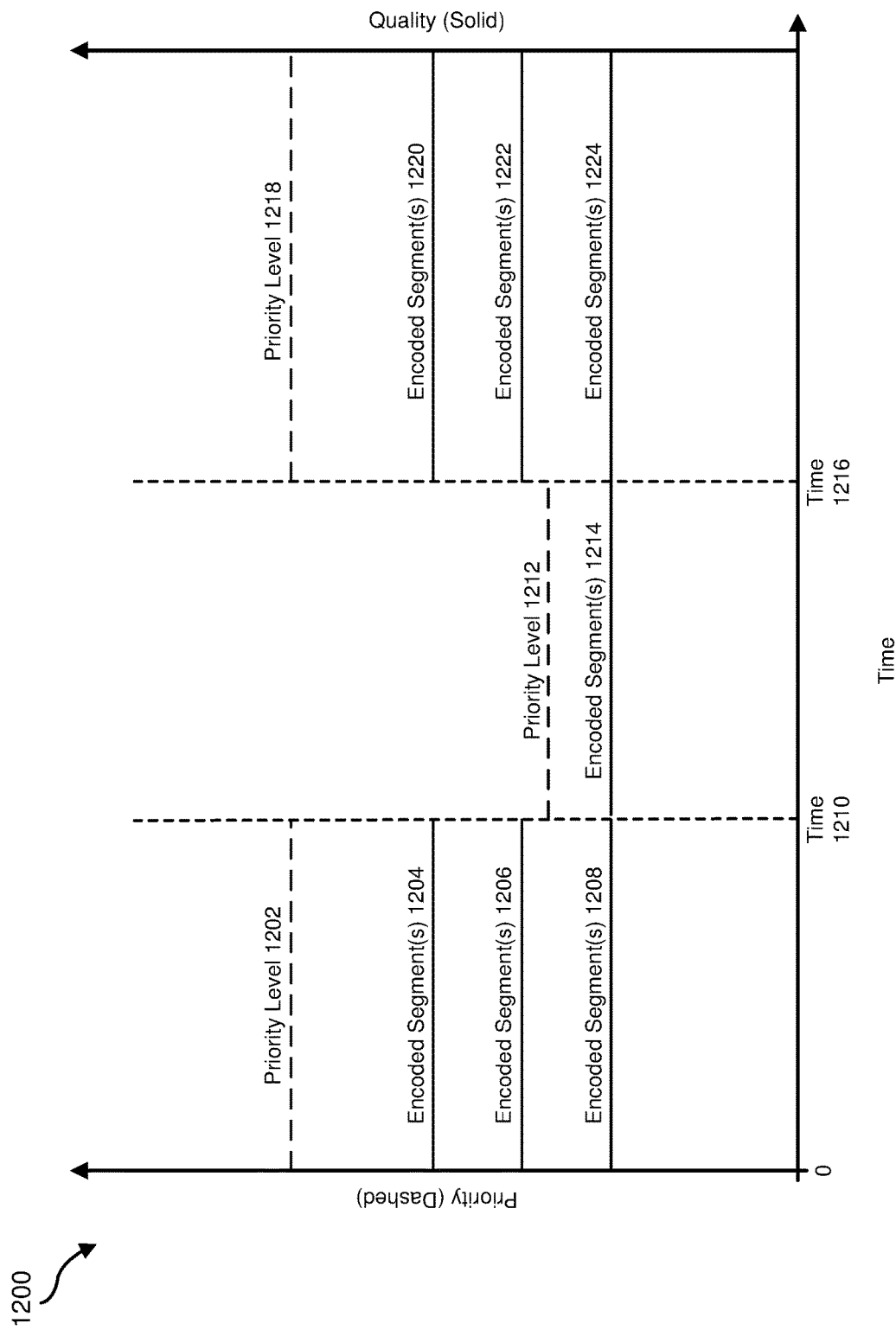
FIG. 12 is a diagram of exemplary priority levels of an exemplary media stream and exemplary qualities of corresponding exemplary encoded segments plotted over time.
Figure 13:
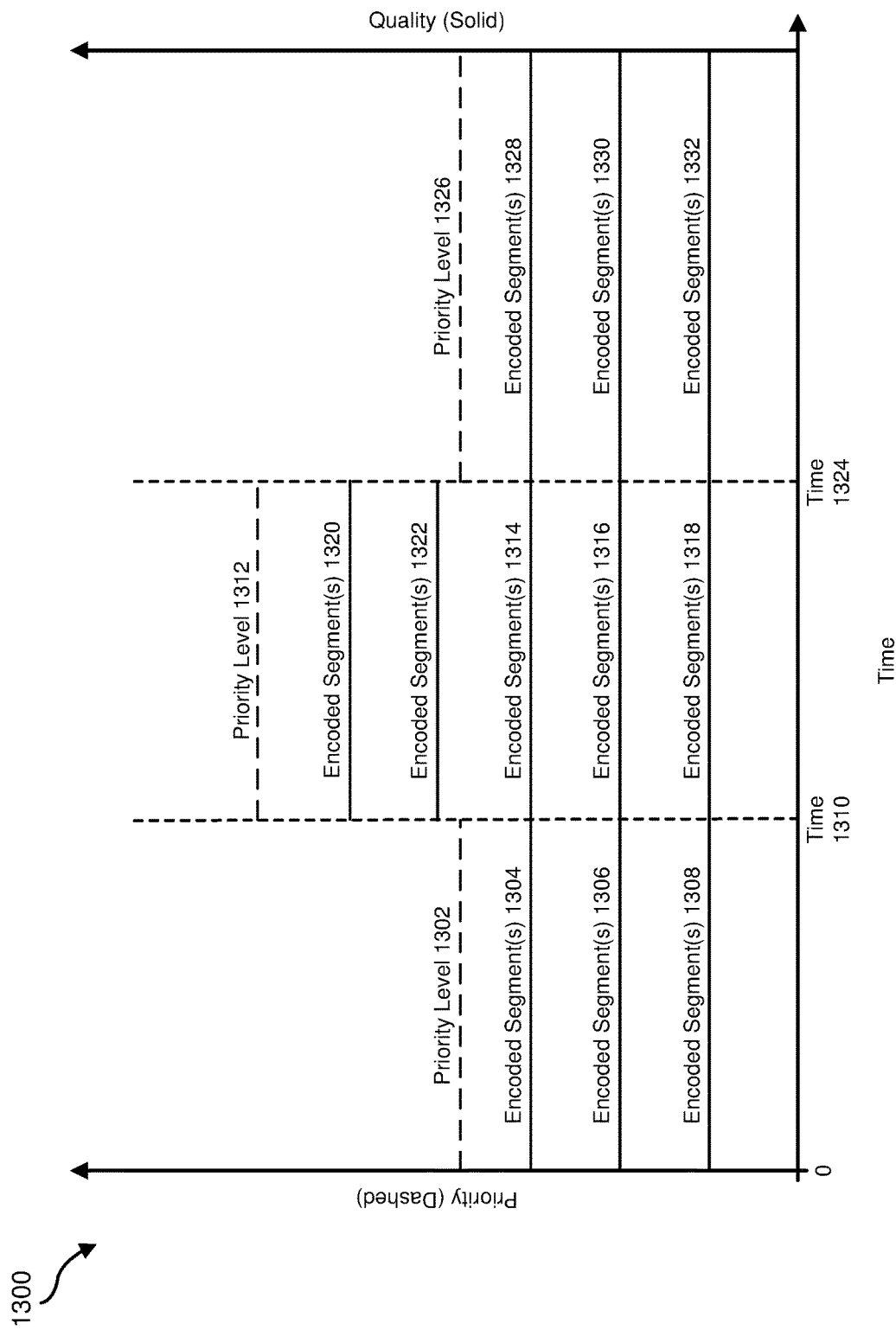
FIG. 13 is a diagram of exemplary priority levels of an exemplary media stream and exemplary qualities of corresponding exemplary encoded segments plotted over time.

FIGS. 11-13 provide examples of how the disclosed systems may decrease and increase the overall quality of a media stream's associated encoded media streams based on decreases and increases to the media stream's priority level over time. FIG. 11 is an exemplary diagram 1100 of exemplary increasing and decreasing priority levels of media stream 208 and the exemplary qualities of its corresponding exemplary encoded media streams 214 plotted over time. In this example, the disclosed systems may determine, at time 0, an initial priority level 1102 for media stream 208 and may generate, based on initial priority level 1102, three encoded media streams 214(1)-(3), illustrated as encoded segment(s) 1104, encoded segment(s) 1106, encoded segment(s) 1108, respectively. At time 1110, the disclosed systems may determine a higher priority level 1112 for media stream 208 in response to changes to metrics 210 and may increase, based on higher priority level 1112, the quality of encoded media streams 214 after time 1110 by generating additional encoded media streams 214(4) and 214(5). In this example, encoded media streams 214(1)-(3) are represented by encoded segments(s) 1114-1118, respectively, and encoded media streams 214(4) and 214(5) are represented by encoded segments(s) 1120 and 1122, respectively. At time 1124, the disclosed systems may determine a lower priority level 1126 for media stream 208 based on additional changes to metrics 210 and may reduce, in response to lower priority level 1126, the quality of encoded media streams 214 after time 1124 by eliminating encoded media stream 214(4) and 214(3). In this example, encoded media streams 214(1), 214(2), and 214(5) are represented by encoded segments(s) 1128-1132, respectively.

FIG. 12 is an exemplary diagram 1200 of exemplary decreasing and increasing priority levels of media stream 208 and the exemplary qualities of its corresponding exemplary encoded media streams 214 plotted over time. In this example, the disclosed systems may determine, at time 0, an initial priority level 1202 for media stream 208 and may generate, based on initial priority level 1202, three encoded media streams 214(1)-(3), illustrated as encoded segment(s) 1204, encoded segment(s) 1206, and encoded segment(s) 1208, respectively. At time 1210, the disclosed systems may determine a lower priority level 1212 for media stream 208 in response to changes to metrics 210 and may reduce, based on lower priority level 1212, the quality of encoded media streams 214 after time 1210 by eliminating encoded streams 214(1) and 214(2), which had the highest qualities amongst encoded media streams 214(1)-(3). In this example, encoded media stream 214(3) is represented by encoded segments(s) 1214. At time 1216, the disclosed systems may determine a higher priority level 1218 for media stream 208 in response to changes to metrics 210 and may increase, based on higher priority level 1218, the overall quality of encoded media streams 214 after time 1310 by reinitializing encoded media streams 214(1) and 214(2). In this example, encoded media streams 214(1), 214(2), and 214(3) are represented by encoded segments(s) 1220-1224, respectively.

FIG. 13 is an exemplary diagram 1300 of exemplary increasing and decreasing priority levels of media stream 208 and the exemplary qualities of its corresponding exemplary encoded media streams 214 plotted over time. In this example, the disclosed systems may determine, at time 0, an initial priority level 1302 for media stream 208 and may generate, based on initial priority level 1302, three encoded media streams 214(1)-(3), illustrated as encoded segment(s) 1304, encoded segment(s) 1306, and encoded segment(s) 1308, respectively. At time 1310, the disclosed systems may determine a higher priority level 1312 for media stream 208 in response to changes to metrics 210 and may increase, based on higher priority level 1312, the overall quality of encoded media streams 214 after time 1310 by generating additional encoded media streams 214(4) and 214(5). In this example, encoded media streams 214(1)-(3) are represented by encoded segments(s) 1314-1318, respectively, and encoded media streams 214(4) and 214(5) are represented by encoded segments(s) 1320 and 1322, respectively. At time 1324, the disclosed systems may determine a lower priority level 1326 for media stream 208 based on additional changes to metrics 210 and may reduce, in response to lower priority level 1326, the overall quality of encoded media streams 214 after time 1324 by eliminating encoded media stream 214(4) and 214(5). In this example, encoded media streams 214(1), 214(2), and 214(3) are represented by encoded segments(s) 1328-1332, respectively.

As described above, embodiments of the present disclosure may, during a live broadcast, dynamically change the overall quality (e.g., bit rate or resolution) of one or more encoded streams carrying the live broadcast based on an up-to-date priority level of the live broadcast. In some embodiments, a live broadcast whose relative priority or importance increases over time may have the quality of its encoded streams increased. For example, a live stream that becomes viral midstream may have the quality of its encoded streams increased in step with its rising viewer count. In other embodiments, a live broadcast whose relative priority or importance decreases over time may have the quality of its encoded streams decreased.

The disclosed systems may monitor various statistics and metrics for triggering changes to quality and/or for dictating quality levels. Such metrics may include broadcast-level metrics (e.g., number of viewers, engagement, importance, usage, content type (e.g., inserted ads or gaming), object recognition, scene recognition (e.g., a score in a sports match), durations, and timing of broadcasted events), server-side system metrics (e.g., CPU, memory, or network bandwidth utilization), or client-side system metrics (e.g., available display resolution, bandwidth, or frame rate). In some embodiments, the disclosed systems may dynamically adjust the qualities of all live broadcasts in order to use a predetermined amount of server-side capacity (e.g., close to 100%). In some examples, the disclosed systems may lower the quality of lower priority broadcasts to preserve and/or increase the quality of higher priority broadcasts.

Example Embodiments

Example 1: A computer-implemented method for dynamically encoding media streams may include (1) receiving a media stream, (2) determining a first priority level for the media stream, (3) generating one or more first encoded segments from a first segment of the media stream based on the first priority level, (4) determining, while generating the one or more first encoded segments, a second priority level for the media stream, the second priority level being different than the first priority level, (5) generating one or more second encoded segments from a second segment of the media stream based on the second priority level, and (6) streaming the one or more first encoded segments and the one or more second encoded segments to one or more client devices.

Example 2: The computer-implemented method of Example 1, wherein the second priority level is a lower priority level relative to the first priority level and generating the one or more second encoded segments may include reducing, in response to the lower priority level for the media stream, a quality of at least one of the one or more second encoded segments relative to a quality of a corresponding one of the one or more first encoded segments.

Example 3: The computer-implemented method of any of Examples 1 or 2, wherein the second priority level is a lower priority level relative to the first priority level and generating the one or more second encoded segments may include generating, in response to the lower priority level for the media stream, a lesser number of the one or more second encoded segments relative to a number of the one or more first encoded segments.

Example 4: The computer-implemented method of any of Examples 1-3, wherein the second priority level is a higher priority level relative to the first priority level and generating the one or more second encoded segments may include increasing, in response to the higher priority level for the media stream, a quality of at least one of the one or more second encoded segments relative to a quality of a corresponding one of the one or more first encoded segments.

Example 5: The computer-implemented method of any of Examples 1-4, wherein the second priority level is a higher priority level relative to the first priority level and generating the one or more second encoded segments may include generating, in response to the higher priority level for the media stream, a greater number of the one or more second encoded segments relative to a number of the one or more first encoded segments.

Example 6: The computer-implemented method of any of Examples 1-5 further including storing each of the one or more first encoded segments at a client-accessible location, storing each of the one or more second encoded segments at a client-accessible location, and storing a manifest associated with the media stream at a client-accessible location. Streaming the one or more first encoded segments may include updating the manifest to describe the client-accessible locations and qualities of the one or more first encoded segments, and streaming the one or more second encoded segments may include updating the manifest to describe the client-accessible locations and qualities of the one or more second encoded segments.

Example 7: The computer-implemented method of any of Examples 1-6, further including transmitting a notification of each update of the manifest to the one or more client devices.

Example 8: The computer-implemented method of any of Examples 1-7 further including storing each of the one or more first encoded segments at a client-accessible location and storing each of the one or more second encoded segments at a client-accessible location. Streaming the one or more first encoded segments may include pushing a notification to the one or more client devices describing the client-accessible locations and qualities of the one or more first encoded segments, and streaming the one or more second encoded segments may include pushing a notification to the one or more client devices describing the client-accessible locations and qualities of the one or more second encoded segments.

Example 9: The computer-implemented method of any of Examples 1-8 further including storing one of the one or more first encoded segments at a client-accessible location and storing a corresponding one of the one or more second encoded segments at the same client-accessible location, wherein a quality of the one of the one or more first encoded segments differs from a quality of the corresponding one of the one or more second encoded segments.

Example 10: The computer-implemented method of any of Examples 1-9, wherein the first priority level and the second priority level of the media stream may be determined based on one or more client-side metrics aggregated across the one or more client devices and/or metrics of the media stream relative to metrics of one or more additional media streams.

Example 11: The computer-implemented method of any of Examples 1-10, wherein the first priority level and the second priority level of the media stream are determined based on a number of concurrent viewers of the media stream.

Example 12: The computer-implemented method of any of Examples 1-11, wherein the first priority level and the second priority level of the media stream are determined based on one or more client-side metrics of the one or more client devices. The one or more client-side metrics may include a metric of client-side decoding resources, a metric of client-side display resources, a metric of client-side network bandwidth, or a metric of client-side engagement.

Example 13: The computer-implemented method of any of Examples 1-12, wherein the media stream is received from an additional client device and the first priority level and the second priority level of the media stream are determined based on one or more client-side metrics of the client device. The one or more client-side metrics may include a metric of client-side recording resources, a metric of client-side location, a metric of client-side network bandwidth, or a metric of client-side surroundings.

Example 14: The computer-implemented method of any of Examples 1-13, wherein the first priority level and the second priority level of the media stream are determined based on one or more server-side metrics. The one or more server-side metrics may include a metric of server-side computing resources, a metric of server-side storage resources, or a metric of server-side network bandwidth.

Example 15: The computer-implemented method of any of Examples 1-14, wherein determining the first priority level for the media stream may include detecting a first element having a first predetermined priority level in the first segment, wherein the first priority level is based on the first predetermined priority level and determining the second priority level for the media stream may include detecting a second element having a second predetermined priority level in the second segment, wherein the second priority level is based on the second predetermined priority level.

Example 16: The computer-implemented method of any of Examples 1-15, wherein at least one of the first priority level and the second priority level of the media stream are determined based on an additional priority level of an additional media stream.

Example 17: A system for dynamically encoding media streams may include at least one physical processor and physical memory having computer-executable instructions that, when executed by the physical processor, cause the physical processor to (1) receive a media stream, (2) determine a first priority level for the media stream, (3) generate one or more first encoded segments from a first segment of the media stream based on the first priority level, (4) determine, while the one or more first encoded segments are being generated, a second priority level for the media stream, the second priority level being different than the first priority level, (5) generate one or more second encoded segments from a second segment of the media stream based on the second priority level, and (6) stream the one or more first encoded segments and the one or more second encoded segments to one or more client devices.

Example 18: The system of Example 17, wherein the one or more first encoded segments and the one or more second encoded segments are streamed to one or more client devices using a hypertext transfer protocol and adaptive-bit-rate streaming.

Example 19: The system of any of Examples 17 or 18, wherein the media stream is received from an additional client device and the first priority level and the second priority level of the media stream are determined based on one or more client-side metrics or one or more server-side metrics. The one or more client-side metrics may include a metric of client-side decoding resources of the one or more client devices, a metric of client-side display resources of the one or more client devices, a metric of client-side network bandwidth of the one or more client devices, a metric of client-side engagement of the one or more client devices, a metric of client-side recording resources of the additional client device, a metric of client-side location of the additional client device, a metric of client-side network bandwidth of the additional client device, or a metric of client-side surroundings of the additional client device. The one or more server-side metrics may include a metric of server-side computing resources, a metric of server-side storage resources, or a metric of server-side network bandwidth.

Example 20: A non-transitory computer-readable medium comprising one or more computer-executable instructions that, when executed by at least one processor of a computing device, cause the computing device to (1) receive a media stream, (2) determine a first priority level for the media stream, (3) generate one or more first encoded segments from a first segment of the media stream based on the first priority level, (4) determine, while the one or more first encoded segments are being generated, a second priority level for the media stream, the second priority level being different than the first priority level, (5) generate one or more second encoded segments from a second segment of the media stream based on the second priority level, and (6) stream the one or more first encoded segments and the one or more second encoded segments to one or more client devices.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive media streams to be transformed, transform the media streams into at least first encoded segments having a first quality and second encoded segments having a second quality, output a result of the transformation to a storage system accessible by client devices, use the result of the transformation to live stream the media stream to the client devices at various levels of quality, and/or store the result of the transformation to enable on-demand viewing of the media stream. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, by at least one server-side device, a media stream from a client-side device; and
   broadcasting, in substantially real time, the media stream to one or more additional client-side devices by:
      determining, by the server-side device at a first time, a first priority level for the media stream;
      generating, by the server-side device, one or more first encoded segments from a first segment of the media stream based on the first priority level;
      streaming, by the server-side device, the one or more first encoded segments to the one or more additional client-side devices;
      determining, by the server-side device at a second time subsequent to the first time, a second priority level for the same media stream, the second priority level being different than the first priority level;
      generating, by the server-side device, one or more second encoded segments from a second segment of the media stream based on the second priority level, wherein:
         the total number of the second encoded segments is made different from the total number of the first encoded segments in response to the second priority level being different from the first priority level; or
         a quality of at least one of the one or more second encoded segments is made different from a quality of a corresponding one of the one or more first encoded segments in response to the second priority level being different from the first priority level; and
      streaming, by the server-side device, the one or more second encoded segments to the one or more additional client-side devices.

2. The computer-implemented method of claim 1, wherein:
   the second priority level is a lower priority level relative to the first priority level; and
   generating the one or more second encoded segments comprises reducing, in response to the lower priority level for the media stream, the quality of the at least one of the one or more second encoded segments relative to the quality of the corresponding one of the one or more first encoded segments.

3. The computer-implemented method of claim 1, wherein:
   the second priority level is a lower priority level relative to the first priority level; and
   generating the one or more second encoded segments comprises generating, in response to the lower priority level for the media stream, a lesser number of the one or more second encoded segments relative to a number of the one or more first encoded segments.

4. The computer-implemented method of claim 1, wherein:
   the second priority level is a higher priority level relative to the first priority level; and
   generating the one or more second encoded segments comprises increasing, in response to the higher priority level for the media stream, the quality of the at least one of the one or more second encoded segments relative to the quality of the corresponding one of the one or more first encoded segments.

5. The computer-implemented method of claim 1, wherein:
   the second priority level is a higher priority level relative to the first priority level; and
   generating the one or more second encoded segments comprises generating, in response to the higher priority level for the media stream, a greater number of the one or more second encoded segments relative to a number of the one or more first encoded segments.

6. The computer-implemented method of claim 1, further comprising:
   storing each of the one or more first encoded segments at a client-accessible location;
   storing each of the one or more second encoded segments at a client-accessible location; and
   storing a manifest associated with the media stream at a client-accessible location, wherein:
      streaming the one or more first encoded segments comprises updating the manifest to describe the client-accessible locations and qualities of the one or more first encoded segments; and
      streaming the one or more second encoded segments comprises updating the manifest to describe the client-accessible locations and qualities of the one or more second encoded segments, the qualities of the one or more second encoded segments being different than the qualities of the one or more first encoded segments.

7. The computer-implemented method of claim 6, further comprising transmitting a notification of each update of the manifest to the one or more additional client-side devices.

8. The computer-implemented method of claim 1, further comprising:
    storing each of the one or more first encoded segments at a client-accessible location; and
    storing each of the one or more second encoded segments at a client-accessible location, wherein:
    streaming the one or more first encoded segments comprises pushing a notification to the one or more additional client-side devices describing the client-accessible locations and qualities of the one or more first encoded segments; and
    streaming the one or more second encoded segments comprises pushing a notification to the one or more additional client-side devices describing the client-accessible locations and qualities of the one or more second encoded segments, the qualities of the one or more second encoded segments being different than the qualities of the one or more first encoded segments.

9. The computer-implemented method of claim 1, further comprising:
    storing one of the one or more first encoded segments at a client-accessible location; and
    storing a corresponding one of the one or more second encoded segments at the same client-accessible location, wherein the quality of the one of the one or more first encoded segments differs from the quality of the corresponding one of the one or more second encoded segments.

10. The computer-implemented method of claim 1, wherein:
    the first priority level of the media stream is determined based on one or more of:
        client-side metrics aggregated across the one or more additional client-side devices during a first time period; or
        stream-dependent metrics of the media stream relative to substantially the same stream-dependent metrics of one or more additional media streams during the first time period; and
    the second priority level of the media stream is determined based on one or more of:
        substantially the same client-side metrics aggregated across the one or more additional client-side devices during a subsequent second time period; or
        substantially the same stream-dependent metrics of the media stream relative to substantially the same stream-dependent metrics of the one or more additional media streams during the subsequent second time period.

11. The computer-implemented method of claim 1, wherein the first priority level and the second priority level of the media stream are determined based on a number of concurrent viewers of the media stream at a first time and a subsequent second time, respectively.

12. The computer-implemented method of claim 1, wherein the first priority level and the second priority level of the media stream are determined based on one or more client-side metrics of the one or more additional client-side devices, the one or more client-side metrics comprising:
    a metric of client-side decoding resources;
    a metric of client-side display resources;
    a metric of client-side network bandwidth; or
    a metric of client-side engagement.

13. The computer-implemented method of claim 1, wherein
    the first priority level and the second priority level of the media stream are determined based on one or more client-side metrics of the client-side device, the one or more client-side metrics comprising:
    a metric of client-side recording resources;
    a metric of client-side location;
    a metric of client-side network bandwidth; or
    a metric of client-side surroundings.

14. The computer-implemented method of claim 1, wherein the first priority level and the second priority level of the media stream are determined based on one or more server-side metrics, the one or more server-side metrics comprising:
    a metric of server-side computing resources;
    a metric of server-side storage resources; or
    a metric of server-side network bandwidth.

15. The computer-implemented method of claim 1, wherein:
    determining the first priority level for the media stream comprises detecting a first element having a first predetermined priority level in the first segment, wherein the first priority level is based on the first predetermined priority level; and
    determining the second priority level for the media stream comprises detecting a second element having a second predetermined priority level in the second segment, wherein the second priority level is based on the second predetermined priority level.

16. The computer-implemented method of claim 1, wherein at least one of the first priority level and the second priority level of the media stream are determined based on an additional priority level of an additional media stream.

17. A server-side system comprising:
    at least one physical processor; and
    physical memory comprising computer-executable instructions that, when executed by the physical processor, cause the physical processor to:
        receive a media stream from a client-side device; and
        broadcast, in substantially real time, the media stream to one or more additional client-side devices by:
            determining, at the server-side system at a first time, a first priority level for the media stream;
            generating, at the server-side system, one or more first encoded segments from a first segment of the media stream based on the first priority level;
            streaming, from the server-side system, the one or more first encoded segments to the one or more additional client-side devices;
            determining, at the server-side system at a second time subsequent to the first time, a second priority level for the same media stream, the second priority level being different than the first priority level;
            generating, at the server-side system, one or more second encoded segments from a second segment of the media stream based on the second priority level, wherein:
                the total number of the second encoded segments is made different from the total number of the first encoded segments in response to the second priority level being different from the first priority level; or
                a quality of at least one of the one or more second encoded segments is made different from a quality of a corresponding one of the one or more first encoded segments in response to the second priority level being different from the first priority level; and streaming, from the server-side system, the one or more second encoded segments to the one or more additional client-side devices.

18. The server-side system of claim 17, wherein the one or more first encoded segments and the one or more second encoded segments are streamed to the one or more additional client-side devices using a hypertext transfer protocol and adaptive-bit-rate streaming.

19. The server-side system of claim 17, further comprising:
one or more server-side computing resources;
one or more server-side storage resources; or
at least one server-side network bandwidth, wherein:
the first priority level and the second priority level of the media stream are determined based on one or more client-side metrics or one or more server-side metrics;
the one or more client-side metrics comprise:
a metric of client-side decoding resources of the one or more additional client-side devices;
a metric of client-side display resources of the one or more additional client-side devices;
a metric of client-side network bandwidth of the one or more additional client-side devices;
a metric of client-side engagement of the one or more additional client-side devices;
a metric of client-side recording resources of the client-side device;
a metric of client-side location of the client-side device;
a metric of client-side network bandwidth of the client-side device; or
a metric of client-side surroundings of the client-side device; and
the one or more server-side metrics comprise:
a metric of the one or more server-side computing resources;
a metric of the one or more server-side storage resources; or
a metric of the at least one server-side network bandwidth.

20. A non-transitory computer-readable medium comprising one or more computer-executable instructions that, when executed by at least one processor of at least one server-side computing device, cause the at least one server-side computing device to:
receive a media stream from a client-side computing device; and
broadcast, in substantially real time, the media stream to one or more additional client-side computing devices by:
determining, by the at least one server-side computing device at a first time, a first priority level for the media stream;
generating, by the at least one server-side computing device, one or more first encoded segments from a first segment of the media stream based on the first priority level;
streaming, by the server-side computing device, the one or more first encoded segments to the one or more additional client-side devices;
determining, by the at least one server-side computing device at a second time subsequent to the first time, a second priority level for the same media stream, the second priority level being different than the first priority level;
generating, by the at least one server-side computing device, one or more second encoded segments from a second segment of the media stream based on the second priority level, wherein:
the total number of the second encoded segments is made different from the total number of the first encoded segments in response to the second priority level being different from the first priority level; or
a quality of at least one of the one or more second encoded segments is made different from a quality of a corresponding one of the one or more first encoded segments in response to the second priority level being different from the first priority level; and
streaming, by the at least one server-side computing device, the one or more second encoded segments to the one or more additional client-side computing devices.

* * * * *